United States Patent
Weissman et al.

(10) Patent No.: US 9,312,888 B2
(45) Date of Patent: Apr. 12, 2016

(54) ANTENNA INTERFACE CIRCUITS FOR CARRIER AGGREGATION ON MULTIPLE ANTENNAS

(71) Applicant: QUALCOMM Incorporated, San Diego, CA (US)

(72) Inventors: Haim M Weissman, Haifa (IL); Rimon E Mansour, Nazareth (IL); Christian Holenstein, La Mesa, CA (US)

(73) Assignee: QUALCOMM Incorporated, San Diego, CA (US)

( * ) Notice: Subject to any disclaimer, the term of this patent is extended or adjusted under 35 U.S.C. 154(b) by 279 days.

(21) Appl. No.: 13/649,965

(22) Filed: Oct. 11, 2012

(65) Prior Publication Data

US 2014/0003300 A1    Jan. 2, 2014

Related U.S. Application Data

(60) Provisional application No. 61/666,088, filed on Jun. 29, 2012.

(51) Int. Cl.
*H04B 7/04* (2006.01)
*H04B 1/00* (2006.01)

(52) U.S. Cl.
CPC ............ *H04B 1/0064* (2013.01); *H04B 7/0404* (2013.01)

(58) Field of Classification Search
USPC .................. 370/334; 455/13.3; 375/260–267
See application file for complete search history.

(56) References Cited

U.S. PATENT DOCUMENTS

| | | | |
|---|---|---|---|
| 5,881,369 | A | 3/1999 | Dean et al. |
| 6,144,260 | A | 11/2000 | Hashimoto et al. |
| 6,380,823 | B1 | 4/2002 | Ikata et al. |
| 6,529,715 | B1 | 3/2003 | Kitko et al. |
| 6,795,690 | B2 | 9/2004 | Weissman et al. |
| 7,250,830 | B2 | 7/2007 | Layne et al. |

(Continued)

FOREIGN PATENT DOCUMENTS

| | | |
|---|---|---|
| CN | 1240550 A | 1/2000 |
| CN | 101416416 A | 4/2009 |

(Continued)

OTHER PUBLICATIONS

3GPP TR 37.801 v0.10.0 (Jan. 2011), 3rd Generation Partnership Project; Technical Specification Group Radio Access Networks; UMTS-LTE 3500 MHz Work Item Technical Report (Release 10).

(Continued)

*Primary Examiner* — Hoon J Chung
(74) *Attorney, Agent, or Firm* — Liberty E. Mann

(57) ABSTRACT

Techniques for supporting data transmission and reception on multiple bands for carrier aggregation are disclosed. In an exemplary design, an apparatus (e.g., a wireless device) includes first and second antenna interface circuits coupled to first and second antennas, respectively. The first antenna interface circuit includes a first transmit (TX) filter for a first band, which may be part of a first triplexer or duplexer. The first TX filter filters a first radio frequency (RF) signal prior to transmission via the first antenna. The second antenna interface circuit includes a second TX filter for a second band, which may be part of a second triplexer or duplexer. The second TX filter filters a second RF signal prior to transmission via the second antenna. The first and second RF signals may be transmitted simultaneously on the first and second bands for carrier aggregation.

27 Claims, 20 Drawing Sheets

(56) References Cited

U.S. PATENT DOCUMENTS

| | | |
|---|---|---|
| 7,383,024 B2 | 6/2008 | Mueller et al. |
| 7,505,790 B2 | 3/2009 | Chang et al. |
| 7,643,848 B2 | 1/2010 | Robinett |
| 7,656,251 B1 | 2/2010 | Bauder et al. |
| 7,796,950 B2 | 9/2010 | Cheng et al. |
| 7,801,556 B2 | 9/2010 | Tran |
| 8,170,487 B2 | 5/2012 | Sahota et al. |
| 8,244,194 B2 | 8/2012 | Morgan et al. |
| 8,320,301 B2 | 11/2012 | Walton et al. |
| 2001/0044292 A1 | 11/2001 | Jeon et al. |
| 2003/0171107 A1 | 9/2003 | Sorrells et al. |
| 2003/0193923 A1 | 10/2003 | Abdelgany et al. |
| 2004/0063437 A1 | 4/2004 | Braun et al. |
| 2005/0104685 A1 | 5/2005 | Kuroki et al. |
| 2005/0227631 A1* | 10/2005 | Robinett ................... 455/83 |
| 2007/0021080 A1 | 1/2007 | Kuriyama et al. |
| 2007/0161358 A1 | 7/2007 | Bogdan |
| 2008/0119158 A1 | 5/2008 | Filipovic et al. |
| 2009/0176470 A1* | 7/2009 | Karakis ................... 455/272 |
| 2009/0253385 A1 | 10/2009 | Dent et al. |
| 2009/0279490 A1 | 11/2009 | Alcorn |
| 2010/0105340 A1 | 4/2010 | Weissman |
| 2010/0135428 A1 | 6/2010 | Yuda et al. |
| 2010/0231472 A1 | 9/2010 | Tran |
| 2010/0261504 A1 | 10/2010 | Lukkarila |
| 2010/0279709 A1 | 11/2010 | Shahidi et al. |
| 2011/0013543 A1 | 1/2011 | Lim et al. |
| 2011/0013677 A1 | 1/2011 | Ibrahim et al. |
| 2011/0045786 A1 | 2/2011 | Leinonen et al. |
| 2011/0159905 A1 | 6/2011 | Zheng |
| 2011/0222443 A1 | 9/2011 | Khlat |
| 2011/0292844 A1 | 12/2011 | Kwun et al. |
| 2012/0044919 A1 | 2/2012 | Medapalli et al. |
| 2012/0044976 A1 | 2/2012 | Lai et al. |
| 2012/0127897 A1 | 5/2012 | Xu et al. |
| 2012/0127898 A1 | 5/2012 | Lim et al. |
| 2012/0190355 A1 | 7/2012 | Van Rooyen |
| 2012/0236976 A1 | 9/2012 | Smith |
| 2012/0243447 A1 | 9/2012 | Weissman et al. |
| 2012/0275350 A1 | 11/2012 | Kwok |
| 2013/0176913 A1* | 7/2013 | Niskanen et al. ............. 370/278 |
| 2013/0322309 A1* | 12/2013 | Smith ................... H04L 5/14 370/281 |

FOREIGN PATENT DOCUMENTS

| | | |
|---|---|---|
| CN | 101502008 A | 8/2009 |
| CN | 101523736 A | 9/2009 |
| EP | 1450502 A2 | 8/2004 |
| EP | 1755230 A2 | 2/2007 |
| EP | 2393205 A2 | 12/2011 |
| JP | 2001196967 A | 7/2001 |
| JP | 2004023536 A | 1/2004 |
| JP | 2005102098 A | 4/2005 |
| JP | 2005167910 A | 6/2005 |
| JP | WO2009039435 A1 | 3/2009 |
| WO | 03061148 A1 | 7/2003 |
| WO | 2007092767 A1 | 8/2007 |
| WO | 2009066199 A2 | 5/2009 |
| WO | 2012008705 A2 | 1/2012 |

OTHER PUBLICATIONS

3GPP TS 36.101 v10.1.1 (Jan. 2011), 3rd Generation Partnership Project; Technical Specification Group Radio Access Network; Evolved Universal Terrestrial Radio Access (E-UTRA); User Equipment (UE) radio transmission and reception (Release 10).

Walsh, Kevin, "RF Switches Guide Signals in Smart Phones," Microwaves & RF, http://www.skyworksinc.com/downloads/press_room/published_articles/Microwave_RF_092010.pdf, Sep. 2010.

Zargari, et al., "A Single-Chip Dual-Band Tri-Mode CMOS Transceiver for IEEE 802.11a/b/g Wireless LAN," IEEE Journal of Solid-State Circuits, vol. 39, No. 12, Dec. 2004, pp. 2239-2249.

International Search Report and Written Opinion—PCT/US2013/048657—ISA/EPO—Oct. 15, 2013.

* cited by examiner

FIG. 2A — Intra-Band Carrier Aggregation on Contiguous Carriers

FIG. 2B — Intra-Band Carrier Aggregation on Non-Contiguous Carriers

FIG. 2C — Inter-Band Carrier Aggregation in Same Band Group

FIG. 2D — Inter-Band Carrier Aggregation in Different Band Groups

US 9,312,888 B2

ANTENNA INTERFACE CIRCUITS FOR CARRIER AGGREGATION ON MULTIPLE ANTENNAS

CLAIM OF PRIORITY UNDER 35 U.S.C. §119

The present application for patent claims priority to Provisional U.S. Application Ser. No. 61/666,088, entitled "ANTENNA INTERFACE CIRCUITS FOR CARRIER AGGREGATION ON MULTIPLE ANTENNAS," filed Jun. 29, 2012, assigned to the assignee hereof, and expressly incorporated herein by reference.

BACKGROUND

I. Field

The present disclosure relates generally to electronics, and more specifically to antenna interface circuits and filters for wireless devices.

II. Background

A wireless device (e.g., a cellular phone or a smartphone) in a wireless communication system may transmit and receive data for two-way communication. The wireless device may include a transmitter for data transmission and a receiver for data reception. For data transmission, the transmitter may modulate a radio frequency (RF) carrier signal with data to obtain a modulated RF signal, amplify the modulated RF signal to obtain an output RF signal having the proper output power level, and transmit the output RF signal via an antenna to a base station. For data reception, the receiver may obtain a received RF signal via the antenna and may amplify and process the received RF signal to recover data sent by the base station.

A wireless device may support carrier aggregation, which is simultaneous operation on multiple carriers. A carrier may refer to a range of frequencies used for communication and may be associated with certain characteristics. For example, a carrier may be associated with system information describing operation on the carrier. A carrier may also be referred to as a component carrier (CC), a frequency channel, a cell, etc. It is desirable to efficiently support carrier aggregation by the wireless device.

DETAILED DESCRIPTION

The detailed description set forth below is intended as a description of exemplary designs of the present disclosure and is not intended to represent the only designs in which the present disclosure can be practiced. The term "exemplary" is used herein to mean "serving as an example, instance, or illustration." Any design described herein as "exemplary" is not necessarily to be construed as preferred or advantageous over other designs. The detailed description includes specific details for the purpose of providing a thorough understanding of the exemplary designs of the present disclosure. It will be apparent to those skilled in the art that the exemplary designs described herein may be practiced without these specific details. In some instances, well-known structures and devices are shown in block diagram form in order to avoid obscuring the novelty of the exemplary designs presented herein.

Antenna interface circuits and filters that can efficiently support carrier aggregation on multiple bands via multiple antennas are disclosed herein. These antenna interface circuits and filters may provide various advantages and may be used for various types of electronic devices such as wireless communication devices.

Figure 1:
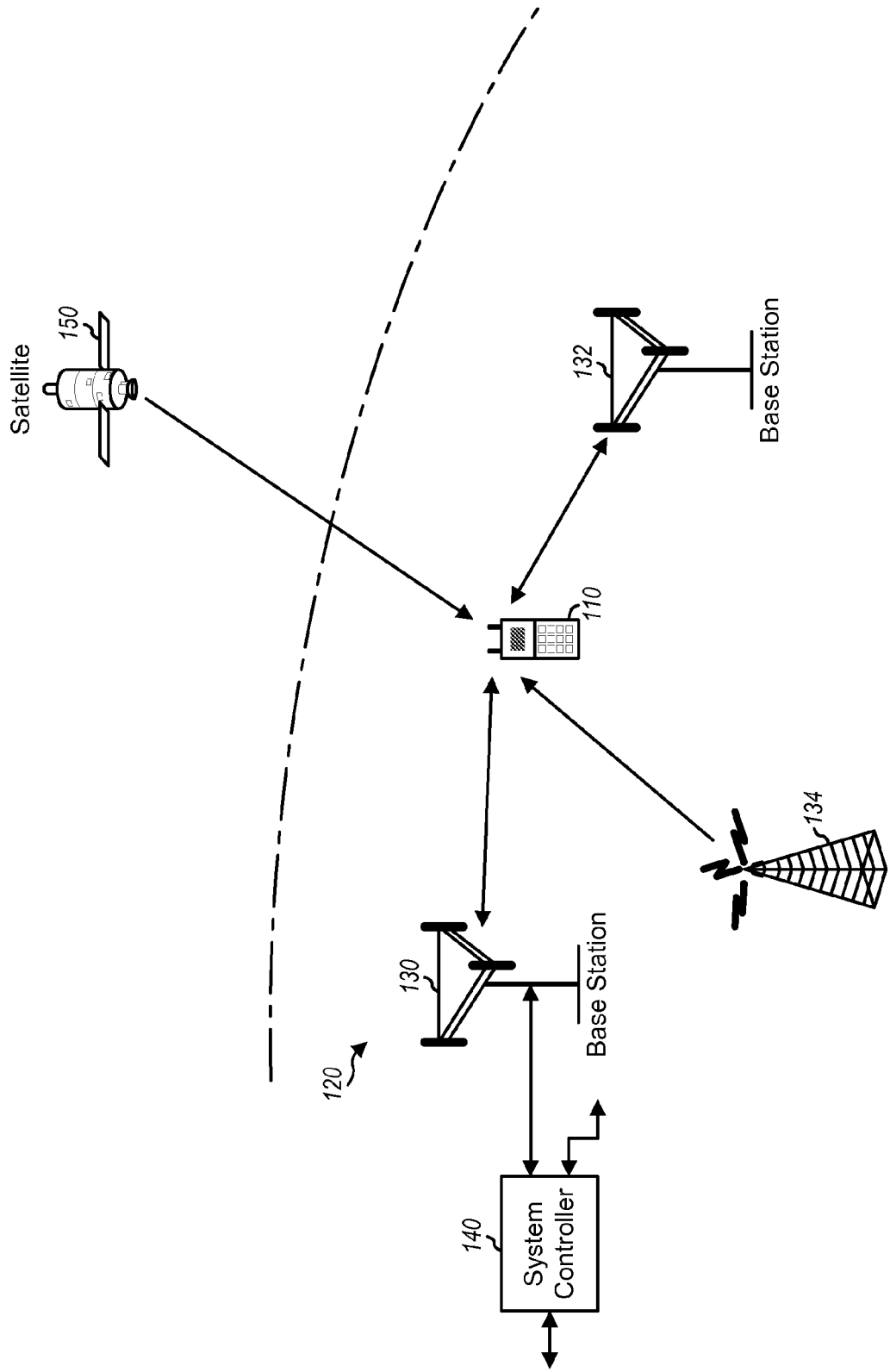
FIG. 1 shows a wireless device communicating with a wireless system.

FIG. 1 shows a wireless device 110 capable of communicating with a wireless communication system 120. Wireless system 120 may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1x, Time Division Synchronous CDMA (TD-SCDMA), or some other version of CDMA. For simplicity, FIG. 1 shows wireless system 120 including two base stations 130 and 132 and one system controller 140. In general, a wireless system may include any number of base stations and any set of network entities.

Wireless device 110 may also be referred to as a user equipment (UE), a mobile station, a terminal, an access terminal, a subscriber unit, a station, etc. Wireless device 110 may be a cellular phone, a smartphone, a tablet, a wireless modem, a personal digital assistant (PDA), a handheld device, a laptop computer, a smartbook, a netbook, a cordless phone, a wireless local loop (WLL) station, a Bluetooth device, etc. Wireless device 110 may be capable of communicating with wireless system 120. Wireless device 110 may also be capable of receiving signals from broadcast stations (e.g., a broadcast station 134), signals from satellites (e.g., a satellite 150) in one or more global navigation satellite systems (GNSS), etc. Wireless device 110 may support one or more radio technologies for wireless communication such as LTE, WCDMA, CDMA 1x, TD-SCDMA, GSM, 802.11, etc.

Wireless device 110 may support carrier aggregation, which is operation on multiple carriers. Carrier aggregation may also be referred to as multi-carrier operation. Wireless device 110 may be able to operate in low-band from 698 to 960 megahertz (MHz), mid-band from 1475 to 2170 MHz, and/or high-band from 2300 to 2690 and 3400 to 3800 MHz. Low-band, mid-band, and high-band refer to three groups of bands (or band groups), with each band group including a number of frequency bands (or simply, "bands"). Each band may cover up to 200 MHz and may include one or more carriers. Each carrier may cover up to 20 MHz in LTE. LTE Release 11 supports 35 bands, which are referred to as LTE/UMTS bands and are listed in 3GPP TS 36.101. Wireless device 110 may be configured with up to 5 carriers in one or two bands in LTE Release 11.

In general, carrier aggregation (CA) may be categorized into two types—intra-band CA and inter-band CA. Intra-band CA refers to operation on multiple carriers within the same band. Inter-band CA refers to operation on multiple carriers in different bands.

Figure 2:
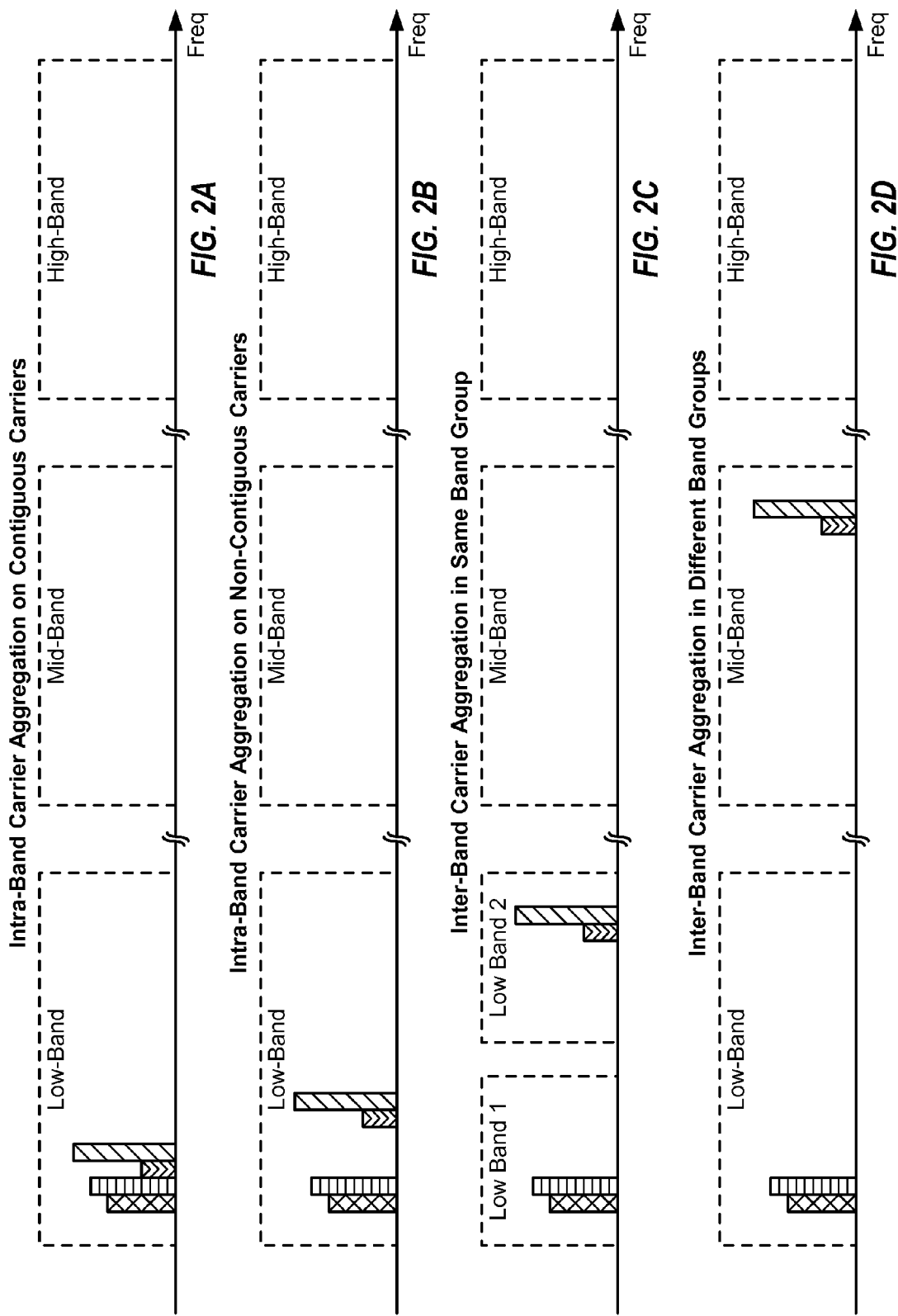
FIGS. 2A to 2D show four examples of carrier aggregation (CA).

FIG. 2A shows an example of contiguous intra-band CA. In the example shown in FIG. 2A, wireless device 110 is configured with four contiguous carriers in the same band in low-band. Wireless device 110 may send and/or receive transmissions on multiple contiguous carriers within the same band.

FIG. 2B shows an example of non-contiguous intra-band CA. In the example shown in FIG. 2B, wireless device 110 is configured with four non-contiguous carriers in the same band in low-band. The carriers may be separated by 5 MHz, 10 MHz, or some other amount. Wireless device 110 may send and/or receive transmissions on multiple non-contiguous carriers within the same band.

FIG. 2C shows an example of inter-band CA in the same band group. In the example shown in FIG. 2C, wireless device 110 is configured with four carriers in two bands in low-band. Wireless device 110 may send and/or receive transmissions on multiple carriers in different bands in the same band group.

FIG. 2D shows an example of inter-band CA in different band groups. In the example shown in FIG. 2D, wireless device 110 is configured with four carriers in two bands in different band groups, which include two carriers in one band in low-band and two additional carriers in another band in mid-band. Wireless device 110 may send and/or receive transmissions on multiple carriers in different bands in different band groups.

FIGS. 2A to 2D show four examples of carrier aggregation. Carrier aggregation may also be supported for other combinations of bands and band groups. For example, carrier aggregation may be supported for low-band and high-band, mid-band and high-band, high-band and high-band, etc.

Inter-band CA may be grouped into four classes/categories, which may include the following:

Class A1—low-band and high-band combination without harmonic relation between bands, Class A2—low-band and high-band combination with harmonic relation between bands, Class A3—low-band and low-band combination or high-band and high-band combination without intermodulation (IM) problems (low-order IM), and Class A4—low-band and low-band combination or high-band and high-band combination with intermodulation problems (low-order IM).

Wireless device 110 may be designed to meet the requirements for all four classes/categories of inter-band CA listed above.

Figure 3:
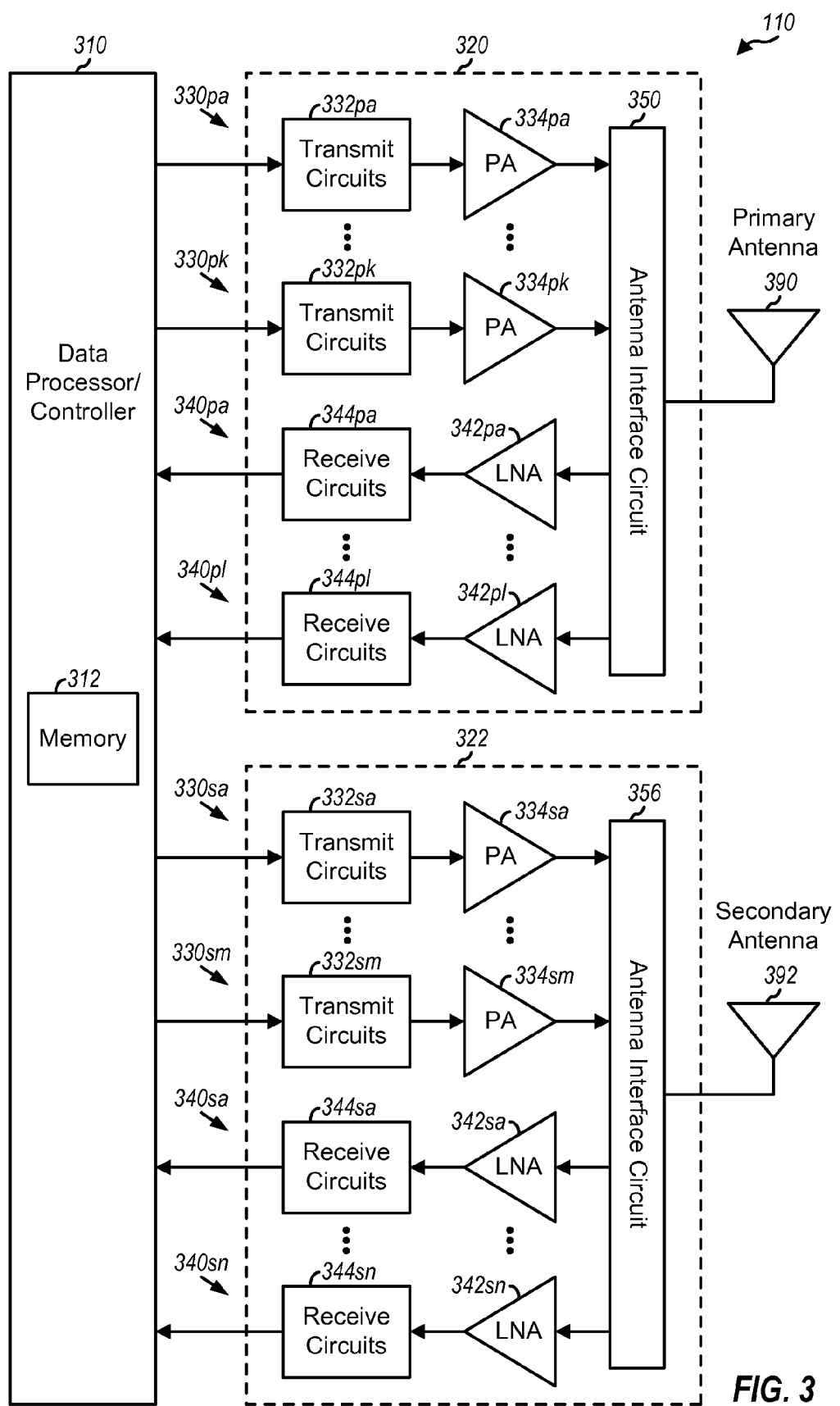
FIG. 3 shows a block diagram of the wireless device in FIG. 1.

FIG. 3 shows a block diagram of an exemplary design of wireless device 110 in FIG. 1. In this exemplary design, wireless device 110 includes a data processor/controller 310, a transceiver 320 coupled to a primary antenna 390, and a transceiver 322 coupled to a secondary antenna 392. Transceiver 320 includes K transmitters 330$pa$ to 330$pk$, L receivers 340$pa$ to 340$pl$, and an antenna interface circuit 350 to support multiple bands, carrier aggregation, multiple radio technologies, etc. K and L may each be any integer value of one or greater. Transceiver 322 includes M transmitters 330$sa$ to 330$sm$, N receivers 340$sa$ to 340$sn$, and an antenna interface circuit 356 to support multiple bands, carrier aggregation, multiple radio technologies, receive diversity, multiple-input multiple-output (MIMO) transmission, etc. M and N may each be any integer value of one or greater.

In the exemplary design shown in FIG. 3, each transmitter 330 includes transmit circuits 332 and a power amplifier (PA) 334. For data transmission, data processor 310 processes (e.g., encodes and modulates) data to be transmitted and provides an analog output signal to a selected transmitter. The description below assumes that transmitter 330$pa$ is the selected transmitter. Within transmitter 330$pa$, transmit circuits 332$pa$ amplify, filter, and upconvert the analog output signal from baseband to RF and provide a modulated RF signal. Transmit circuits 332$pa$ may include amplifiers, filters, mixers, matching circuits, an oscillator, a local oscillator (LO) generator, a phase-locked loop (PLL), etc. A PA 334$pa$ receives and amplifies the modulated RF signal and provides an output RF signal having the proper output power level. The output RF signal is routed through antenna interface circuit 350 and transmitted via antenna 390. Antenna interface circuit 350 may include one or more filters, duplexers, diplexers, triplexers, quadplexers, switches, matching circuits, directional couplers, etc. Each remaining transmitter 330 in transceivers 320 and 322 may operate in similar manner as transmitter 330$pa$.

In the exemplary design shown in FIG. 3, each receiver 340 includes a low noise amplifier (LNA) 342 and receive circuits 344. For data reception, antenna 390 receives signals from base stations and/or other transmitter stations and provides a received RF signal, which is routed through antenna interface circuit 350 and provided to a selected receiver. The description below assumes that receiver 340$pa$ is the selected receiver. Within receiver 340$pa$, LNA 342$pa$ amplifies the received RF signal and provides an amplified RF signal. Receive circuits 344$pa$ downconvert the amplified RF signal from RF to baseband, amplify and filter the downconverted signal, and provide an analog input signal to data processor 310. Receive circuits 344$pa$ may include mixers, filters, amplifiers, matching circuits, an oscillator, an LO generator, a PLL, etc. Each remaining receiver 340 in transceivers 320 and 322 may operate in similar manner as receiver 340$pa$.

FIG. 3 shows an exemplary design of transmitters 330 and receivers 340. A transmitter and a receiver may also include other circuits not shown in FIG. 3, such as filters, matching circuits, etc. All or a portion of transceivers 320 and 322 may be implemented on one or more analog integrated circuits (ICs), RF ICs (RFICs), mixed-signal ICs, etc. For example, transmit circuits 332, LNAs 342, and receive circuits 344 may be implemented on one module, which may be an RFIC, etc. Antenna interface circuits 350 and 356 and PAs 334 may be implemented on another module, which may be a hybrid module, etc. The circuits in transceivers 320 and 322 may also be implemented in other manners.

Data processor/controller 310 may perform various functions for wireless device 110. For example, data processor 310 may perform processing for data being transmitted via transmitters 330 and data being received via receivers 340. Controller 310 may control the operation of transmit circuits 332, PAs 334, LNAs 342, receive circuits 344, antenna interface circuits 350 and 356, or a combination thereof. A memory 312 may store program codes and data for data processor/controller 310. Data processor/controller 310 may be implemented on one or more application specific integrated circuits (ASICs) and/or other ICs.

Antenna interface circuits 350 and 356 may be implemented in various manners to support carrier aggregation. Some exemplary designs of antenna interface circuits 350 and 356 are described below. In general, an antenna interface circuit may include any number of duplexers, diplexers, triplexers, quadplexers, switches, etc. A duplexer typically includes a transmit (TX) filter for data transmission and a receive (RX) filter for data reception. The TX filter and the RX filter are typically designed for a particular band. A diplexer typically includes a lowpass filter and a highpass filter, which may be used to separate signals in two band groups.

Figure 4A:
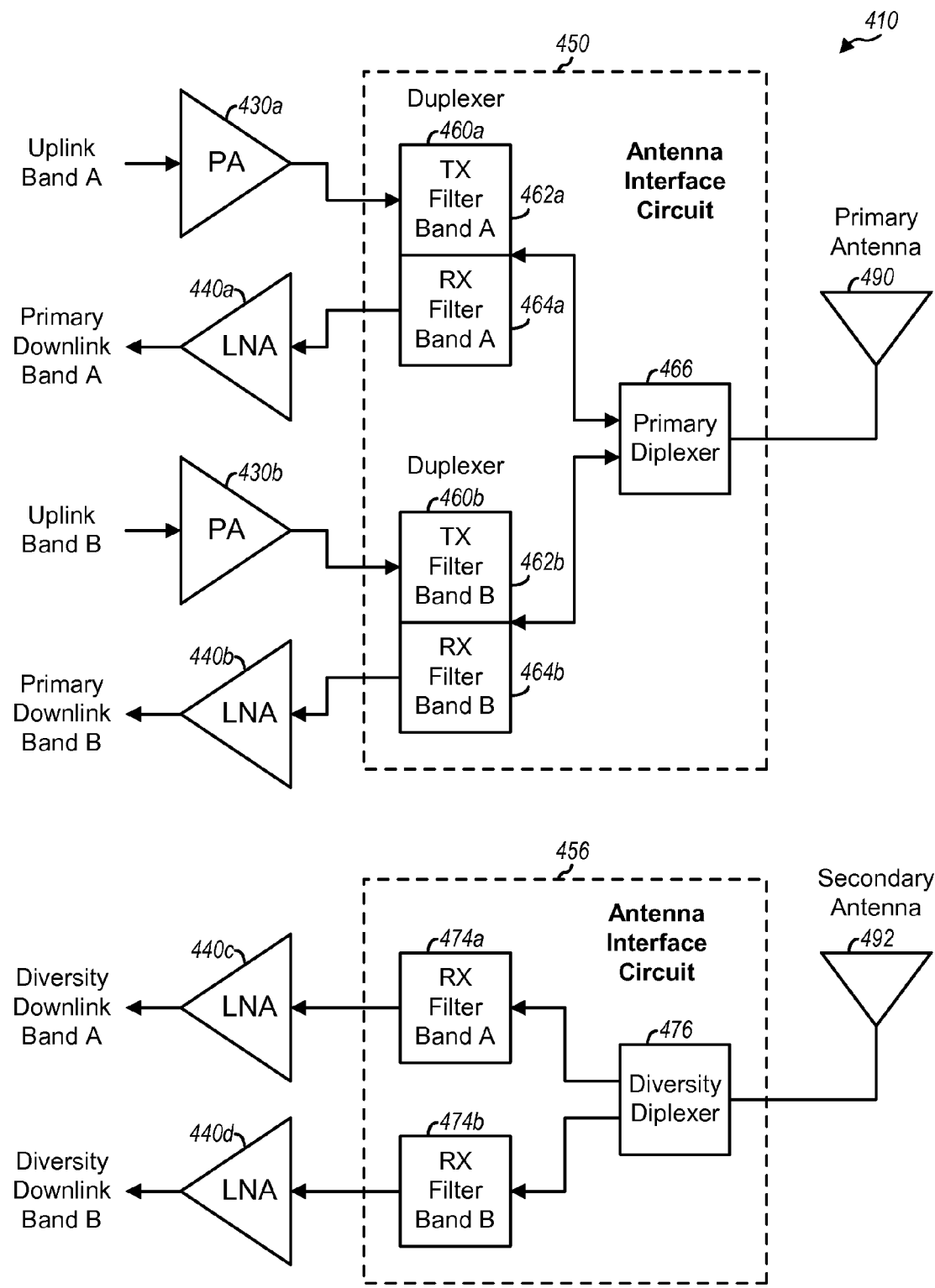
FIGS. 4A and 4B show two exemplary designs of an RF front-end unit supporting carrier aggregation on two bands via two antennas with full multiplexing.

FIG. 4A shows an exemplary design of an RF front-end unit 410 comprising antenna interface circuits 450 and 456 supporting carrier aggregation on two bands A and B. Antenna interface circuits 450 and 456 may be used for antenna interface circuits 350 and 356, respectively, in FIG. 3. Antenna interface circuit 450 supports data transmission on the uplink on bands A and B and data reception on the downlink on bands A and B via a primary antenna 490. Antenna interface circuit 456 supports data reception on the downlink on bands A and B via a secondary antenna 492 for receive diversity.

Antenna interface circuit 450 includes a duplexer 460a for band A, a duplexer 460b for band B, and a diplexer 466. Duplexer 460a includes a TX filter 462a for band A coupled to a PA 430a and an RX filter 464a for band A coupled to an LNA 440a. The output of TX filter 462a and the input of RX filter 464a are coupled to an output of duplexer 460a. Duplexer 460b includes a TX filter 462b for band B coupled to a PA 430b and an RX filter 464b for band B coupled to an LNA 440b. The output of TX filter 462b and the input of RX filter 464b are coupled to an output of duplexer 460b. Diplexer 466 includes a first input coupled to the output of duplexer 460a, a second input coupled to the output of duplexer 460b, and an output coupled to antenna 490. Diplexer 466 includes a lowpass filter and a highpass filter, with one filter being coupled between the first input and the output of diplexer 466, and the other filter being coupled between the second input and the output of diplexer 466. For example, band A may be in low-band, and band B may be in high-band. Duplexer 460a may then be coupled to the lowpass filter within diplexer 466, and duplexer 460b may be coupled to the highpass filter within diplexer 466.

Antenna interface circuit 456 includes an RX filter 474a for band A, an RX filter 474b for band B, and a diplexer 476. RX filter 474a is coupled between an LNA 440c and diplexer 476. RX filter 474b is coupled between an LNA 440d and diplexer 476. Diplexer 476 has its output coupled to antenna 492, which is a secondary/diversity antenna.

Figure 4B:
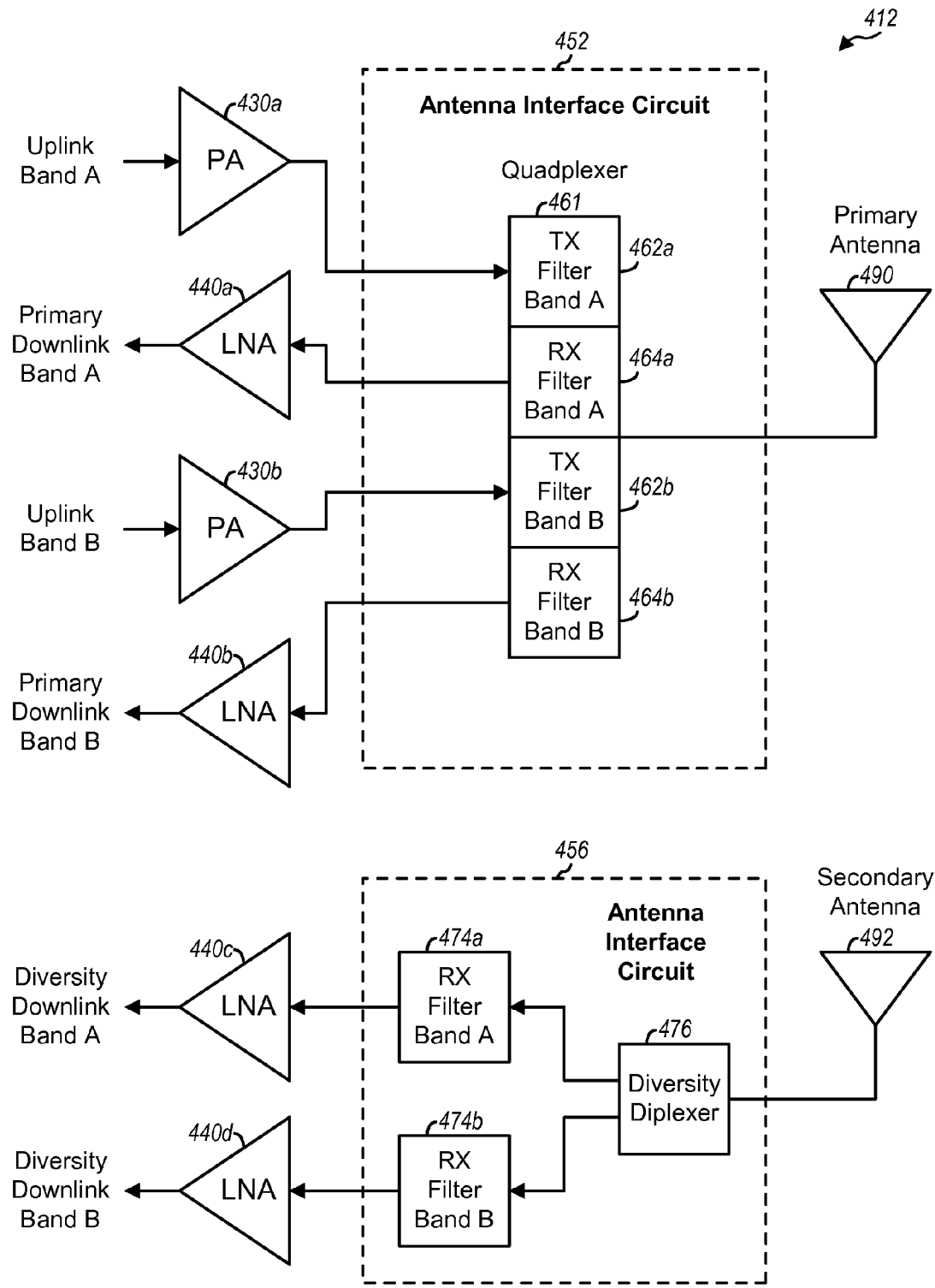

FIG. 4B shows an exemplary design of an RF front-end unit 412 comprising antenna interface circuits 452 and 456 supporting carrier aggregation on two bands A and B. Antenna interface circuit 452 may be used for antenna interface circuit 350 in FIG. 3. Antenna interface circuit 452 includes a quadplexer 461 for bands A and B. Quadplexer 461 includes TX filter 462a and RX filter 464a for band A and TX filter 462b and RX filter 464b for band B. The outputs of TX filters 462a and 462b and the inputs of RX filters 464a and 464b are coupled to an output of quadplexer 461, which is coupled to antenna 490.

The exemplary design in FIG. 4A uses (i) two duplexers 460a and 460b and one diplexer 466 for primary antenna 490 and (ii) two RX filters 474a and 474b and one diplexer 476 for secondary/diversity antenna 492. For class A2 and class A4 inter-band CA, a harmonic rejection filter may be coupled between each duplexer 460 and diplexer 466. The exemplary design in FIG. 4B uses (i) quadplexer 461 that combines the two duplexers 460a and 460b together for primary antenna 490 and (ii) two RX filters 474a and 474b and one diplexer 476 for secondary/diversity antenna 492. The exemplary designs in FIGS. 4A and 4B may have a larger circuit size and additional components, which may increase the cost of a wireless device. The exemplary designs in FIGS. 4A and 4B may also have higher insertion loss due to additional components and matching issues, which may adversely impact the performance of a wireless device.

The exemplary designs in FIGS. 4A and 4B support carrier aggregation on two bands with "full" multiplexing of two bands A and B on one antenna. In particular, data transmission and reception on both bands A and B are supported via primary antenna 490 using either (i) two duplexers 460a and 460b and diplexer 466 in FIG. 4A or (ii) quadplexer 461 in FIG. 4B.

Carrier aggregation with full multiplexing may have various disadvantages. First, combining two duplexers into a quadplexer (e.g., as shown in FIG. 4B) or using two duplexers and a diplexer (e.g., as shown in FIG. 4A) may be harder to implement, especially when the frequency gap between two bands A and B is small. Second, insertion loss for a quadplexer (e.g., as shown in FIG. 4B) or combined duplexers with diplexer (e.g., as shown in FIG. 4A) may be relatively high, which may degrade the performance of a transceiver. Third, sending data transmissions simultaneously on two bands via the same antenna may require extra design efforts in order to achieve sufficiently low harmonic and intermodulation distortion (IMD) products. Fourth, the exemplary designs in FIGS. 4A and 4B may result in larger circuit area, higher component count, and/or higher cost.

In an aspect of the present disclosure, carrier aggregation may be supported with "partial" multiplexing of transmissions on multiple bands via multiple antennas. Partial multiplexing refers to transmission on only a subset of the multiple bands via each antenna. For example, carrier aggregation on two bands A and B may be supported by transmitting on band A via a primary antenna and transmitting on band B via a secondary antenna. Partial multiplexing may provide benefits from antenna-to-antenna isolation, which may reduce power levels of harmonics and IMD products generated due to non-linearity of circuits when data transmission and reception occur simultaneously on multiple bands. Partial multiplexing may also result in simpler circuits, which may reduce the size and cost of a wireless device.

Figure 5A:
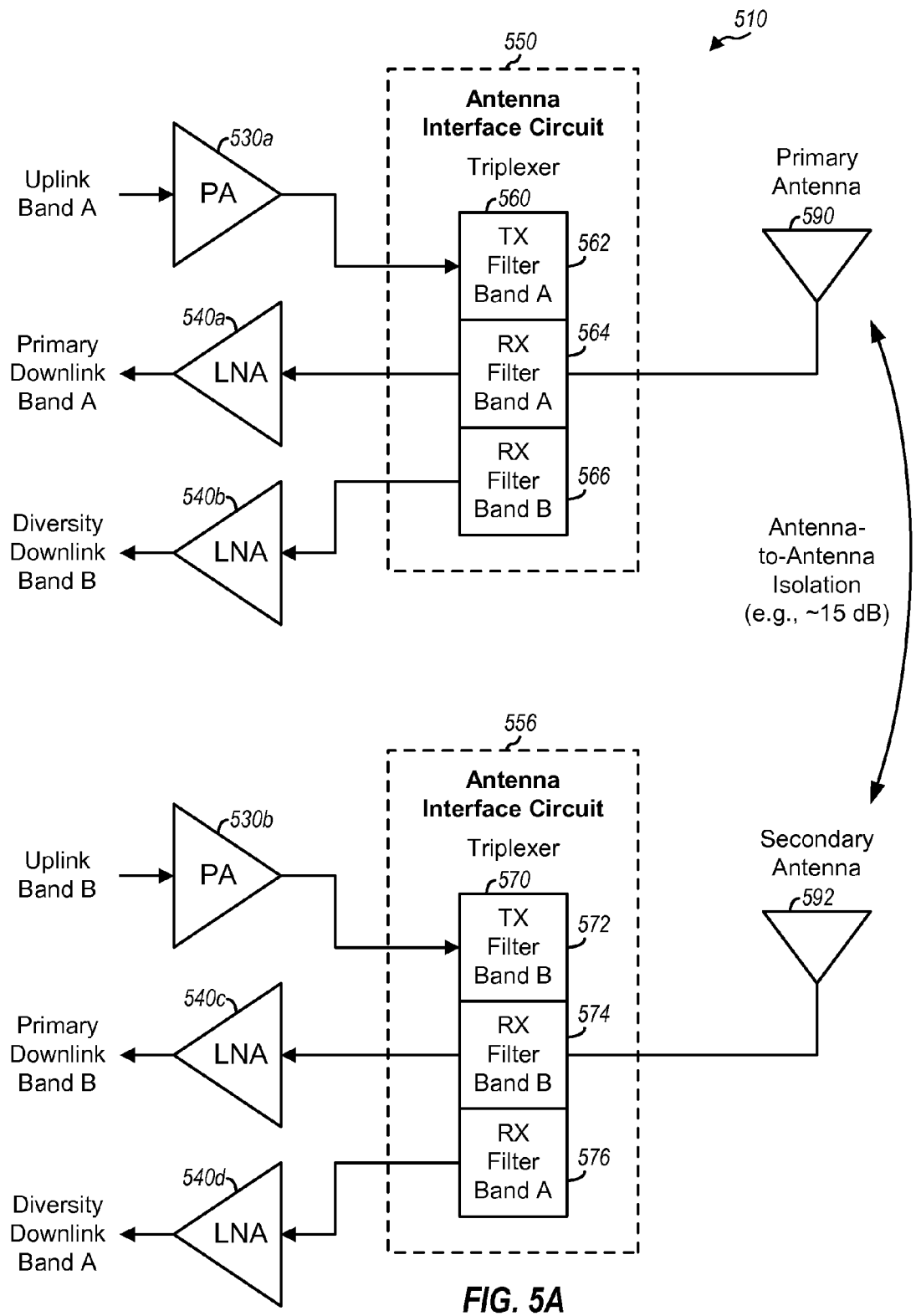
FIGS. 5A to 5F show six exemplary designs of an RF front-end unit supporting carrier aggregation on two bands via two antennas with partial multiplexing.

FIG. 5A shows an exemplary design of an RF front-end unit 510 comprising antenna interface circuits 550 and 556 supporting carrier aggregation on two bands A and B via two antennas with partial multiplexing and diversity reception for both bands. Antenna interface circuits 550 and 556 may be used for antenna interface circuits 350 and 356, respectively, in FIG. 3. Antenna interface circuit 550 supports data transmission on the uplink on band A and data reception on the downlink on bands A and B via a primary antenna 590. Antenna interface circuit 556 supports data transmission on the uplink on band B and data reception on the downlink on bands A and B via a secondary antenna 592.

In the exemplary design shown in FIG. 5A, antenna interface circuit 550 includes a triplexer 560 for bands A and B. Triplexer 560 includes a TX filter 562 for band A coupled to a PA 530a, an RX filter 564 for band A coupled to an LNA 540a, and an RX filter 566 for band B coupled to an LNA

540*b*. The output of TX filter 562 and the inputs of RX filters 564 and 566 are coupled to an output of triplexer 560, which is coupled to antenna 590.

In general, a "triplexer" is a circuit module/block comprising at least three filters, e.g., one TX filter and two RX filters. A triplexer may also include more than three filters, and all or a subset of the filters may be used. For example, a triplexer may include four filters, but only three filters may be used and may be coupled to the inputs and output of the triplexer. A "multiplexer" is a circuit module/block comprising at least two filters. A multiplexer may be a diplexer, a triplexer, a quadplexer, etc.

In the exemplary design shown in FIG. 5A, antenna interface circuit 556 includes a triplexer 570 for bands A and B. Triplexer 570 includes a TX filter 572 for band B coupled to a PA 530*b*, an RX filter 574 for band B coupled to an LNA 540*c*, and an RX filter 576 for band A coupled to an LNA 540*d*. The output of TX filter 572 and the inputs of RX filters 574 and 576 are coupled to an output of triplexer 570, which is coupled to antenna 592.

TX filters 562 and 572 and RX filters 564, 566, 574 and 576 may be implemented in various manners. A TX filter or an RX filter may be implemented with a surface acoustic wave (SAW) filter, a bulk acoustic wave (BAW) filter, a thin film bulk acoustic resonator (FBAR) filter, a micro-electro-mechanical system (MEMS) filter, a ceramic filter, etc.

In the exemplary design shown in FIG. 5A, data transmission and reception for band A as well as diversity data reception for band B are supported via antenna interface circuit 550 and primary antenna 590. Data transmission and reception for band B as well as diversity data reception for band A are supported via antenna interface circuit 556 and secondary antenna 592. Antenna-to-antenna isolation between primary antenna 590 and secondary antenna 592 may be exploited in order to reduce power levels of harmonics and IMD products, which may improve performance.

Figure 5B:
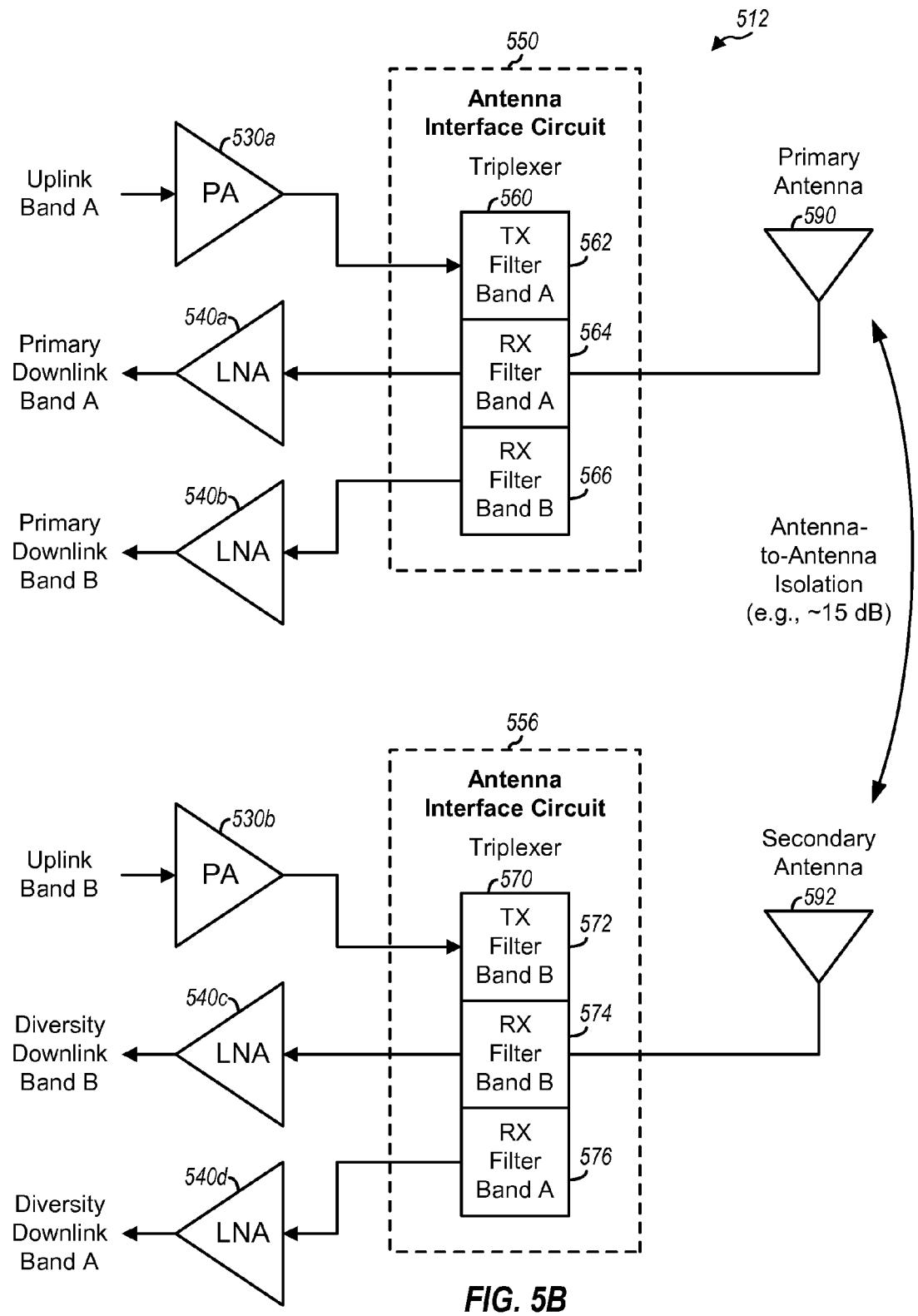

FIG. 5B shows an exemplary design of an RF front-end unit 512 comprising antenna interface circuits 550 and 556 supporting carrier aggregation on two bands A and B. In the exemplary design shown in FIG. 5B, data transmission and primary data reception for band A as well as primary data reception for band B are supported via antenna interface circuit 550 and primary antenna 590. Data transmission and diversity data reception for band B as well as diversity data reception for band A are supported via antenna interface circuit 556 and secondary antenna 592.

Figure 5C:
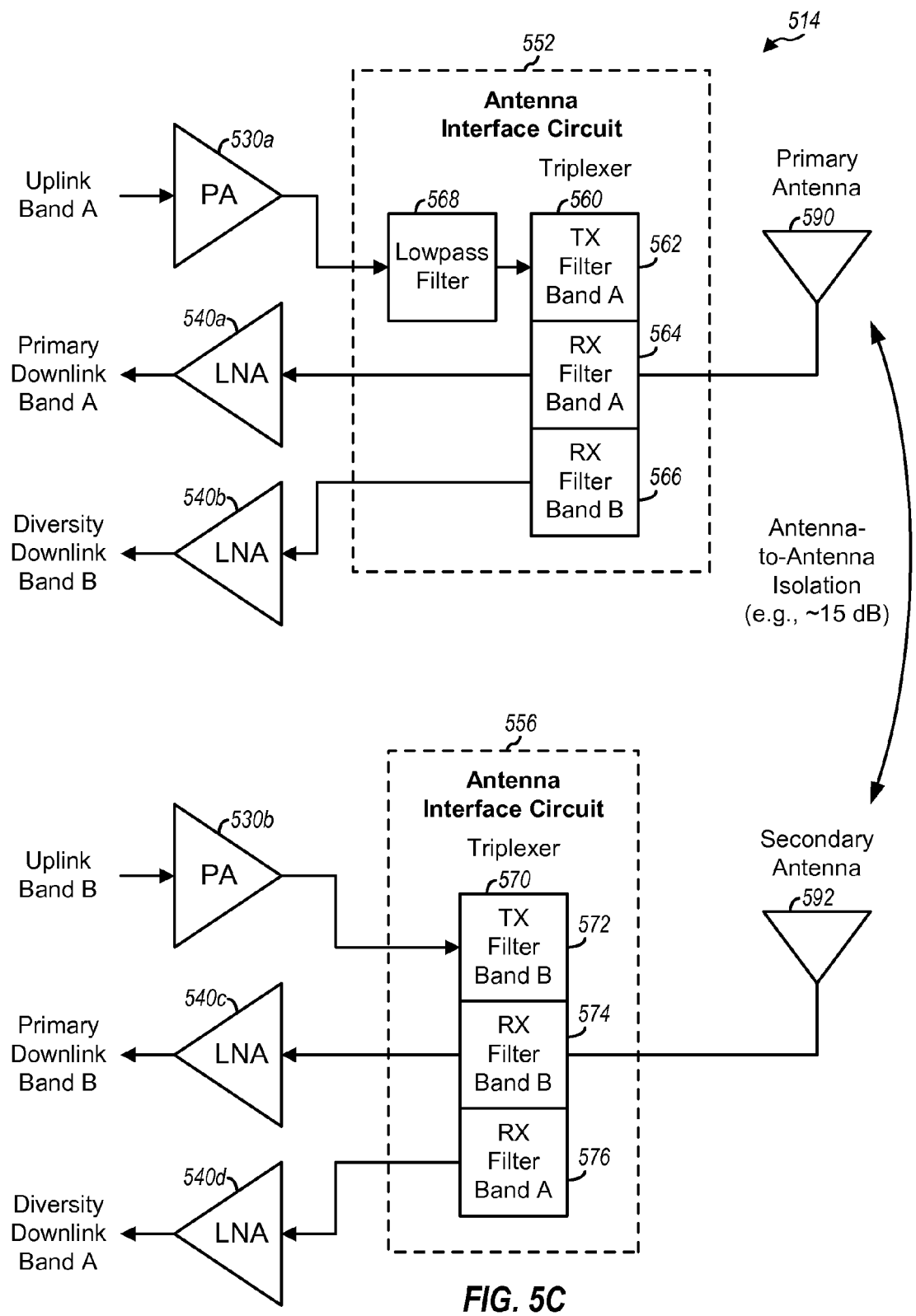

FIG. 5C shows an exemplary design of an RF front-end unit 514 comprising antenna interface circuits 552 and 556 supporting carrier aggregation on two bands A and B. Antenna interface circuits 552 and 556 may be used for antenna interface circuits 350 and 356, respectively, in FIG. 3. Antenna interface circuit 552 supports data transmission on the uplink on band A and data reception on the downlink on bands A and B via primary antenna 590. Antenna interface circuit 556 supports data transmission on the uplink on band B and data reception on the downlink on bands A and B via secondary antenna 592.

In the exemplary design shown in FIG. 5C, antenna interface circuit 552 includes a lowpass filter 568 and triplexer 560. Lowpass filter 568 has its input coupled to the output of PA 530*a* and its output coupled to the input of TX filter 562 within triplexer 560. Lowpass filter 568 filters an amplified RF signal from PA 530*a* to pass signal components within band A and attenuate high-frequency signal components higher than band A.

The amplified RF signal from PA 530*a* may be transmitted in band A and may have a harmonic that falls within a receive frequency range of band B. For example, the amplified RF signal may be transmitted in Band 17 and may have a third harmonic that falls within the receive frequency range of Band 4. By locating TX for band A on primary antenna 590 and primary RX for band B on secondary antenna 592, isolation between primary antenna 590 and secondary antenna 592 can be exploited to provide attenuation (e.g., of approximately 15 dB) of a harmonic of the amplified RF signal falling on band B. Lowpass filter 568 can filter the amplified RF signal and provide additional attenuation of the harmonic of the amplified RF signal. Lowpass filter 568 can thus provide rejection of the harmonic of the amplified RF signal on band A, which may be beneficial for both primary RX on band B via secondary antenna 592 and diversity RX on band B via primary antenna 590.

Although not shown in FIG. 5C, a lowpass filter may be coupled between PA 530*b* and TX filter 572 and may be used to attenuate out-of-band signal components (e.g., harmonics) of an amplified RF signal from PA 530*b*.

Figure 5D:
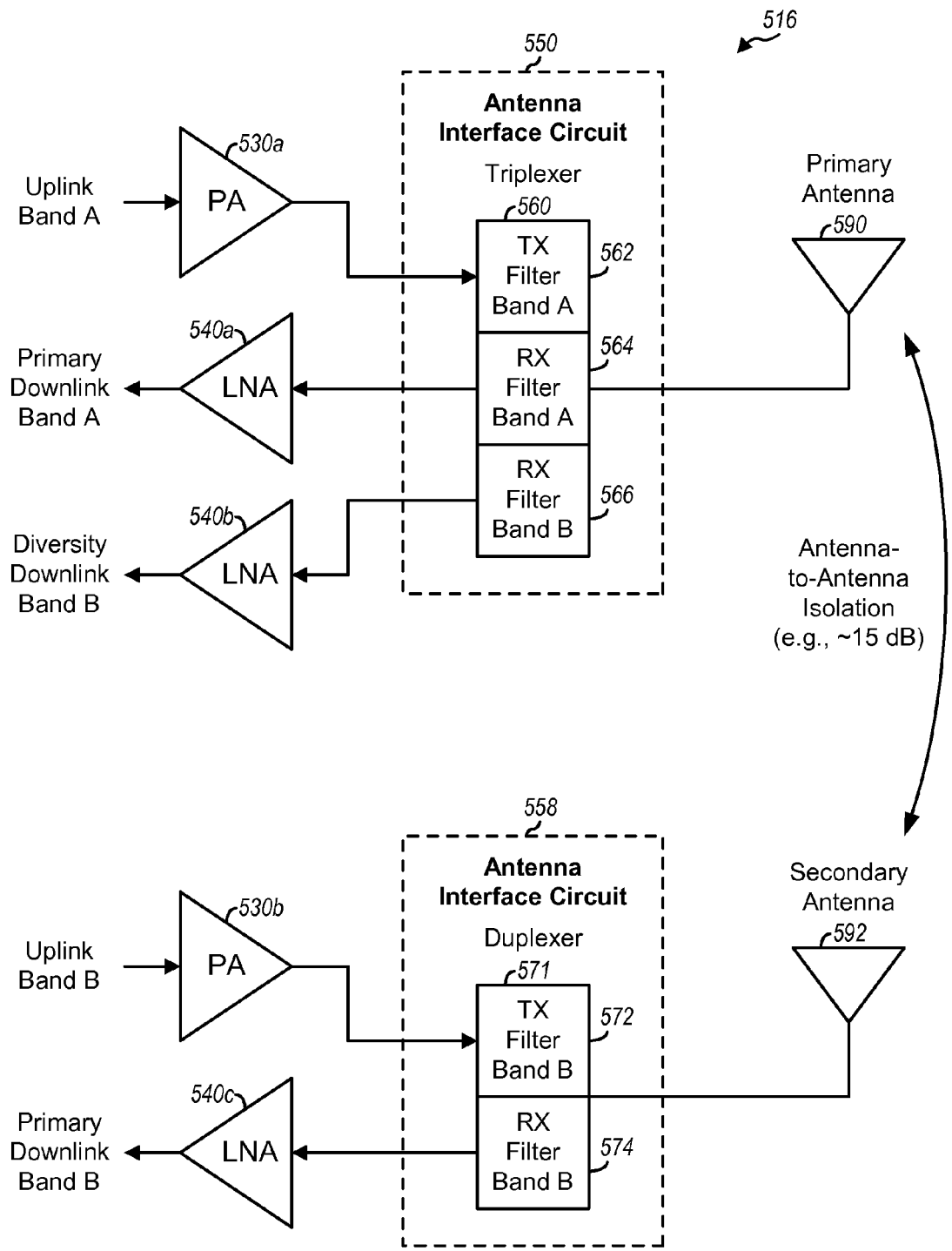

FIG. 5D shows an exemplary design of an RF front-end unit 516 comprising antenna interface circuits 550 and 558 supporting carrier aggregation on two bands A and B via two antennas with diversity reception for only one band. Antenna interface circuits 550 and 558 may be used for antenna interface circuits 350 and 356, respectively, in FIG. 3. Antenna interface circuit 550 supports data transmission on the uplink on band A and data reception on the downlink on bands A and B via primary antenna 590. Antenna interface circuit 558 supports data transmission on the uplink and data reception on the downlink on band B via secondary antenna 592. Antenna interface circuit 558 includes a duplexer 571 for band B. Duplexer 571 includes TX filter 572 for band B coupled to PA 530*b* and RX filter 574 for band B coupled to LNA 540*c*. The output of TX filter 572 and the input of RX filter 574 are coupled to an output of duplexer 571, which is coupled to antenna 592.

Figure 5E:
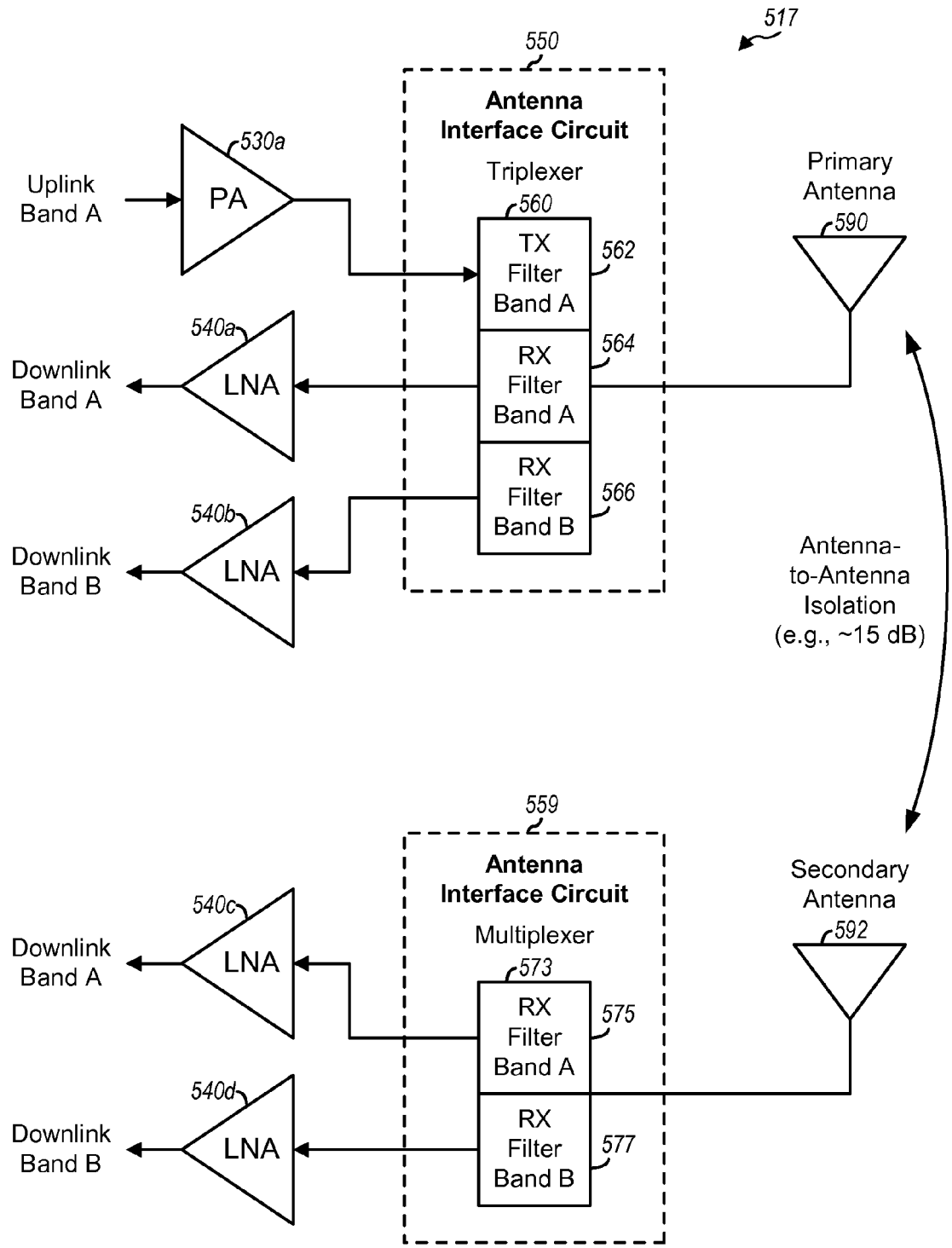

FIG. 5E shows an exemplary design of an RF front-end unit 517 comprising antenna interface circuits 550 and 559 supporting carrier aggregation on two bands A and B via two antennas with diversity reception for two bands. Antenna interface circuits 550 and 559 may be used for antenna interface circuits 350 and 356, respectively, in FIG. 3. Antenna interface circuit 550 supports data transmission on the uplink on band A and data reception on the downlink on bands A and B via primary antenna 590. Antenna interface circuit 559 supports data reception on the downlink on bands A and B via secondary antenna 592. Antenna interface circuit 559 includes a multiplexer 573 for bands A and B. Multiplexer 573 includes an RX filter 575 for band A coupled to LNA 540*c* and an RX filter 577 for band B coupled to an LNA 540*d*. The outputs of RX filters 575 and 577 are coupled to an output of multiplexer 573, which is coupled to antenna 592.

Figure 5F:
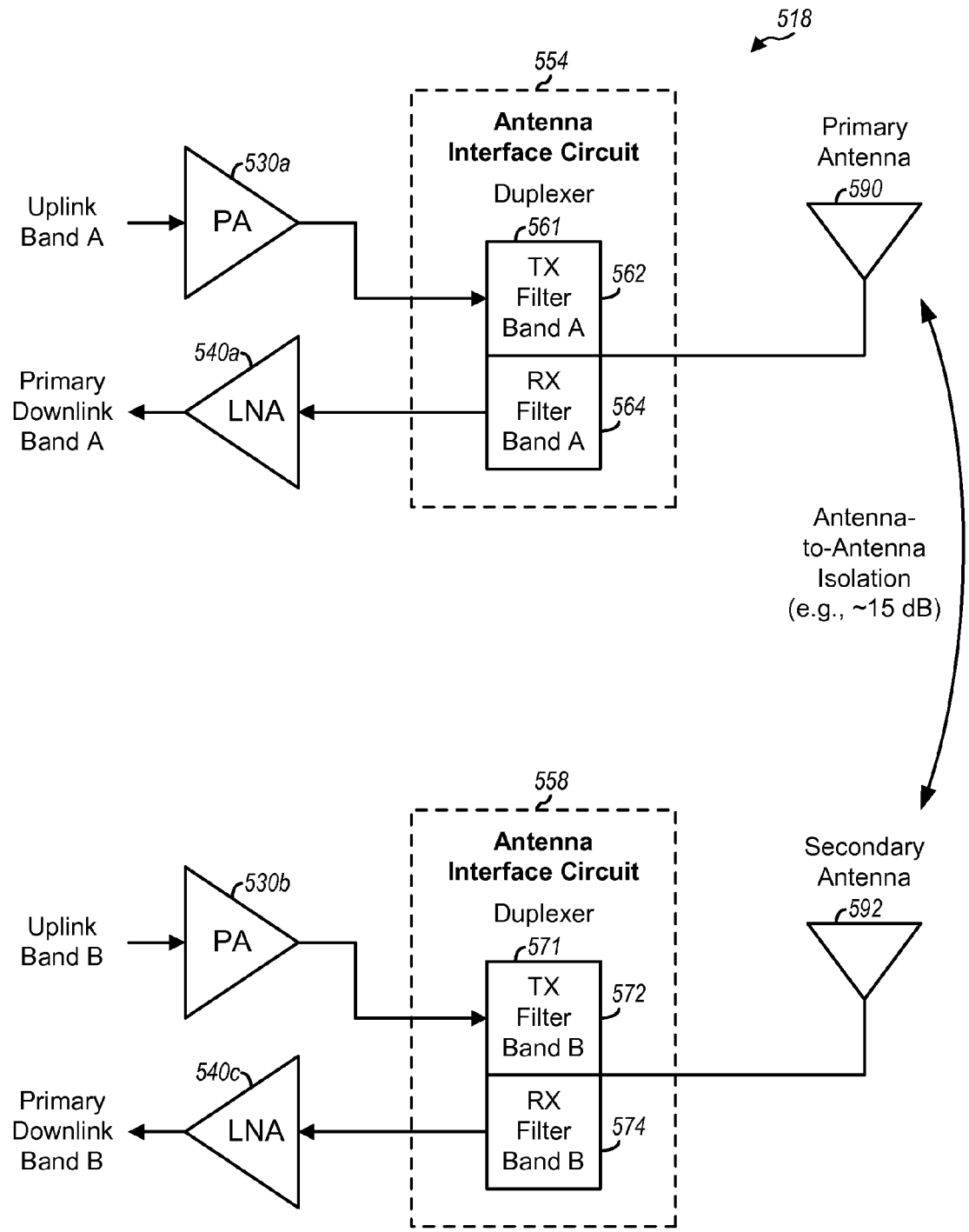

FIG. 5F shows an exemplary design of an RF front-end unit 518 comprising antenna interface circuits 554 and 558 supporting carrier aggregation on two bands A and B via two antennas without diversity reception. Antenna interface circuits 554 and 558 may be used for antenna interface circuits 350 and 356, respectively, in FIG. 3. Antenna interface circuit 554 supports data transmission on the uplink and data reception on the downlink on band A via primary antenna 590. Antenna interface circuit 554 includes a duplexer 561 for band A. Duplexer 561 includes TX filter 562 for band A coupled to PA 530*a* and RX filter 564 for band A coupled to LNA 540*a*. The output of TX filter 562 and the input of RX filter 564 are coupled to an output of duplexer 561, which is coupled to antenna 590. Antenna interface circuit 558 supports data transmission on the uplink and data reception on the downlink on band B via secondary antenna 592 and is described above for FIG. 5D.

The exemplary designs shown in FIGS. 5A to 5F may be used to support various combinations of bands. Table 1 lists three exemplary combinations of bands that may be supported by the exemplary designs shown in FIGS. 5A to 5F. The bands in Table 1 are defined for LTE/UMTS and may be referred to as LTE bands. The frequencies in Table 1 are in units of MHz.

TABLE 1

|  | Band A | | Band B | |
| --- | --- | --- | --- | --- |
|  | Uplink Frequency | Downlink Frequency | Uplink Frequency | Downlink Frequency |
| Example 1 | Band 1 TX 1920 to 1980 | Band 1 RX 2110 to 2170 | Band 21 TX 1447.9 to 1462.9 | Band 21 RX 1495.9 to 1510.9 |
| Example 2 | Band 5 TX 824 to 849 | Band 5 RX 869 to 894 | Band 12 TX 699 to 716 | Band 12 RX 726 to 746 |
| Example 3 | Band 4 TX 1710 to 1755 | Band 4 RX 2110 to 2155 | Band 17 TX 704 to 716 | Band 17 RX 734 to 736 |

In example 1 in Table 1, carrier aggregation is supported for Band 1 in high-band and Band 21 in mid-band. In example 2, carrier aggregation is supported for Band 5 in low-band and Band 12 in low-band. In example 3, carrier aggregation is supported for Band 4 in high-band and Band 17 in low-band. Band 17 has a TX/uplink frequency range of 704 to 716 MHz. The third harmonic of the uplink frequency range for Band 17 falls between 2112 and 2148 MHz, which overlaps the RX/downlink frequency range of 2110 to 2155 for Band 4. Data transmission on the uplink on Band 17 may interfere with data reception on the downlink on Band 4. The level/degree that Band 17 interferes with Band 4 may be dependent on various factors such as harmonic rejection in a low-band duplexer, harmonic rejection in a diplexer, and harmonic attenuation due to antenna-to-antenna isolation between the primary and secondary antennas. For example, the second harmonic of a transmit signal on Band 17 may mix with a received signal on Band 17 and may cause interference to a received signal on Band 4.

Partial multiplexing may provide various advantages for the band combinations in examples 1 to 3. First, antenna separation may result in minimal band matching. Second, lower insertion loss may be obtained, and it may be easier to match impedance and/or power for a triplexer (e.g., in FIG. 5A) than two duplexers (e.g., in FIG. 4A). Third, better isolation may be achieved between bands. Fourth, no additional RX filters may be required for receive diversity. Fifth, better immunity to harmonics and IMD products may be achieved between PAs. Sixth, no additional transmit antennas may be required, because the primary and secondary antennas typically already exist on many wireless devices.

FIGS. 5A to 5F show exemplary designs of RF front-end units supporting carrier aggregation on two bands A and B via two antennas with partial multiplexing. In general, partial multiplexing may be used to support carrier aggregation on any number of bands via any number of antennas. To support carrier aggregation with partial multiplexing on K bands via N antennas, where K>1 and N>1, each antenna may support data transmission on a different subset of the K bands. In one exemplary design, the N antennas may support data transmission on the same number of bands. For example, each antenna may support data transmission on only one band, or on two bands, etc. In another exemplary design, the N antennas may support data transmission on different numbers of bands. For example, one antenna may support data transmission on one band, another antenna may support data transmission on two bands, etc. For both exemplary designs, each antenna may also support data reception on any number of bands. The N antennas may support data reception on the same number of bands or on different numbers of bands. For example, each antenna may support data reception on all bands, or on one band, or on two bands, or on either one or two bands, etc.

Figure 6:
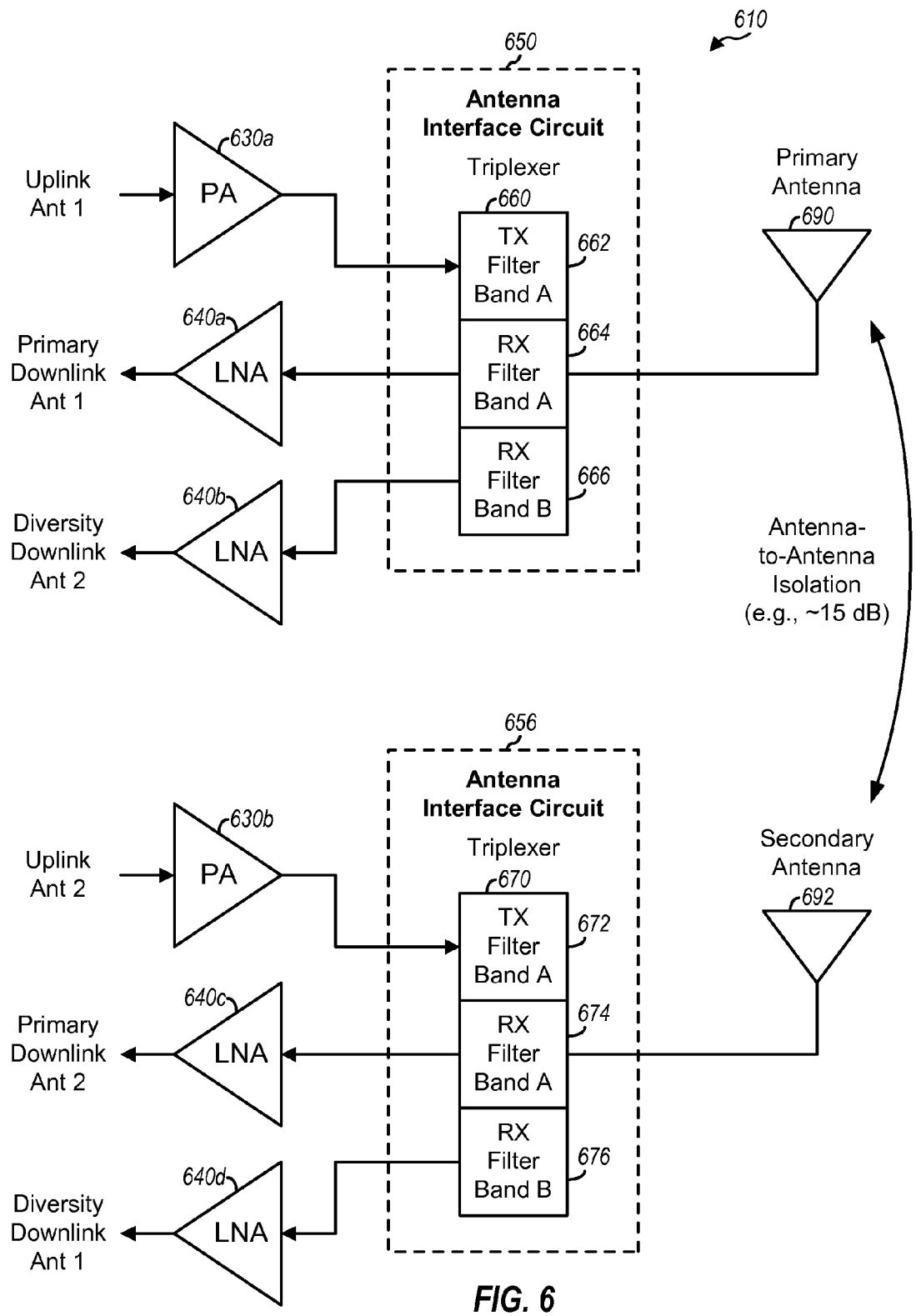
FIG. 6 shows an exemplary design of an RF front-end unit supporting multiple-input multiple-output (MIMO) communication and carrier aggregation on one band via two antennas.

FIG. 6 shows an exemplary design of an RF front-end unit 610 comprising antenna interface circuits 650 and 656 supporting MIMO communication and inter-band carrier aggregation on one band A and intra-band carrier aggregation on two bands A and B via two antennas. RF front-end unit 610 also supports inter-band carrier aggregation when band A supports both uplink and downlink whereas band B supports only downlink. Antenna interface circuits 650 and 656 may be used for antenna interface circuits 350 and 356, respectively, in FIG. 3. Antenna interface circuit 650 supports data transmission on the uplink and data reception on the downlink for a first antenna via a primary antenna 690. Antenna interface circuit 656 supports data transmission on the uplink and data reception on the downlink for a second antenna via a secondary antenna 692.

In the exemplary design shown in FIG. 6, antenna interface circuit 650 includes a triplexer 660 for bands A and B. Triplexer 660 includes a TX filter 662 coupled to a PA 630a, an RX filter 664 coupled to an LNA 640a, and an RX filter 666 coupled to an LNA 640b. The output of TX filter 662 and the inputs of RX filters 664 and 666 are coupled to an output of triplexer 660, which is coupled to antenna 690.

In the exemplary design shown in FIG. 6, antenna interface circuit 656 includes a triplexer 670 for bands A and B. Triplexer 660 includes a TX filter 672 coupled to a PA 630b, an RX filter 674 coupled to an LNA 640c, and an RX filter 676 coupled to an LNA 640d. The output of TX filter 672 and the inputs of RX filters 674 and 676 are coupled to an output of triplexer 670, which is coupled to antenna 692.

In the exemplary design shown in FIG. 6, data transmission and reception for the first antenna as well as diversity data reception for the second antenna are supported via antenna interface circuit 650 and primary antenna 690. Data transmission and reception for the second antenna as well as diversity data reception for the first antenna are supported via antenna interface circuit 656 and secondary antenna 692. Antenna-to-antenna isolation between primary antenna 690 and secondary antenna 692 may be exploited to reduce power levels of harmonics and IMD products, which may improve performance.

FIG. 6 shows an exemplary design of using partial multiplexing to support MIMO communication. Partial multiplexing may also be used to support MIMO communication in other manners. A triplexer may be used for each antenna (e.g., as shown in FIG. 6) and may support (i) either contiguous or non-contiguous intra-band CA operation and/or (ii) MIMO operation, without any hardware or implementation change.

The exemplary designs in FIGS. 5A to 5E use a simple triplexer for each of at least one antenna to multiplex one transmit band with two receive bands. The primary antenna may support data transmission on one band A and data reception on two bands A and B (e.g., as shown in FIGS. 5A and 5B). The secondary antenna may support data transmission on one band B and data reception on two bands A and B (e.g., as shown in FIGS. 5A and 5B). For FIGS. 5A and 5B, the outputs of LNAs 540a and 540d may be routed to appropriate receive circuits for band A. The outputs of LNAs 540b and 540c may be routed to appropriate receive circuits for band B.

Inter-band CA may be better supported with partial multiplexing, e.g., as shown in FIGS. 5A to 5F. For class A1 inter-band CA, it may be easier to match a duplexer (e.g., comprising TX filter 562 and RX filter 564) for band A and RX filter 566 for band B in triplexer 560 than multiplexing two duplexers for bands A and B in a quadplexer. For class A2 inter-band CA, it may be easier to achieve better harmonic and IMD rejection for data transmission on a single band (e.g., as shown in FIG. 5A) as compared to simultaneous data transmissions on two bands band via a quadplexer and a single antenna (e.g., as shown in FIG. 4B). For class A3 inter-band CA, lower insertion loss may be achieved for a triplexer comprising a duplexer and an RX filter (e.g., as shown in FIG. 5A) than two duplexers and a diplexer (e.g., as shown in FIG. 4A), especially when the frequency gap between the two bands is relatively small.

Supporting data transmission on a subset of bands (e.g., on one band) on each antenna via partial multiplexing (e.g., as shown in FIGS. 5A to 5F) may provide various advantages. First, partial multiplexing may support all four classes A1 to A4 of inter-band CA described above. Second, two triplexers 560 and 570 may be used for two antennas, one triplexer for each antenna. Triplexers may be easier to implement and may have lower insertion loss than a quadplexer (e.g., as shown in FIG. 4B) or a combination of two duplexers and a diplexer (e.g., as shown in FIG. 4A). Triplexers may also have a smaller circuit area and fewer part count as compared to the exemplary designs in FIGS. 4A and 4B.

Third, data transmission on different bands via different antennas with partial multiplexing may reduce the power levels of harmonics and IMD products. Active circuits and passive circuits (e.g., switches, duplexers, quadplexers, triplexers, diplexers, PAs, etc.) in a transceiver may inherently have some non-linearity. Simultaneous data transmissions on multiple bands may result in generation of harmonics and IMD products due to non-linearity of circuits in the transceiver. For example, third order intermodulation product (IM3) may result from intermodulation of data transmissions via two transmitters that are present in an RF front-end unit. The IM3 may fall within a receive frequency range and may act as interference that may hinder the ability of a wireless device to receive/detect a desired signal on the downlink, which is commonly referred to as de-sensing. Data transmission and reception simultaneously on two bands via two different antennas may reduce the level of de-sensing IM3. Furthermore, antennas may generate IM3 products due to limited linearity. Separating data transmissions on two bands into two different antennas may mitigate the requirements of an antenna system according to the antenna-to-antenna isolation. In particular, linearity requirements of an antenna may be reduced by an amount that may be dependent on the amount of antenna-to-antenna isolation.

FIGS. 5A to 5F show exemplary design of partial multiplexing to support carrier aggregation on two bands via two antennas. Partial multiplexing may also be used to support carrier aggregation on more than two bands via two antennas.

Figure 7A:
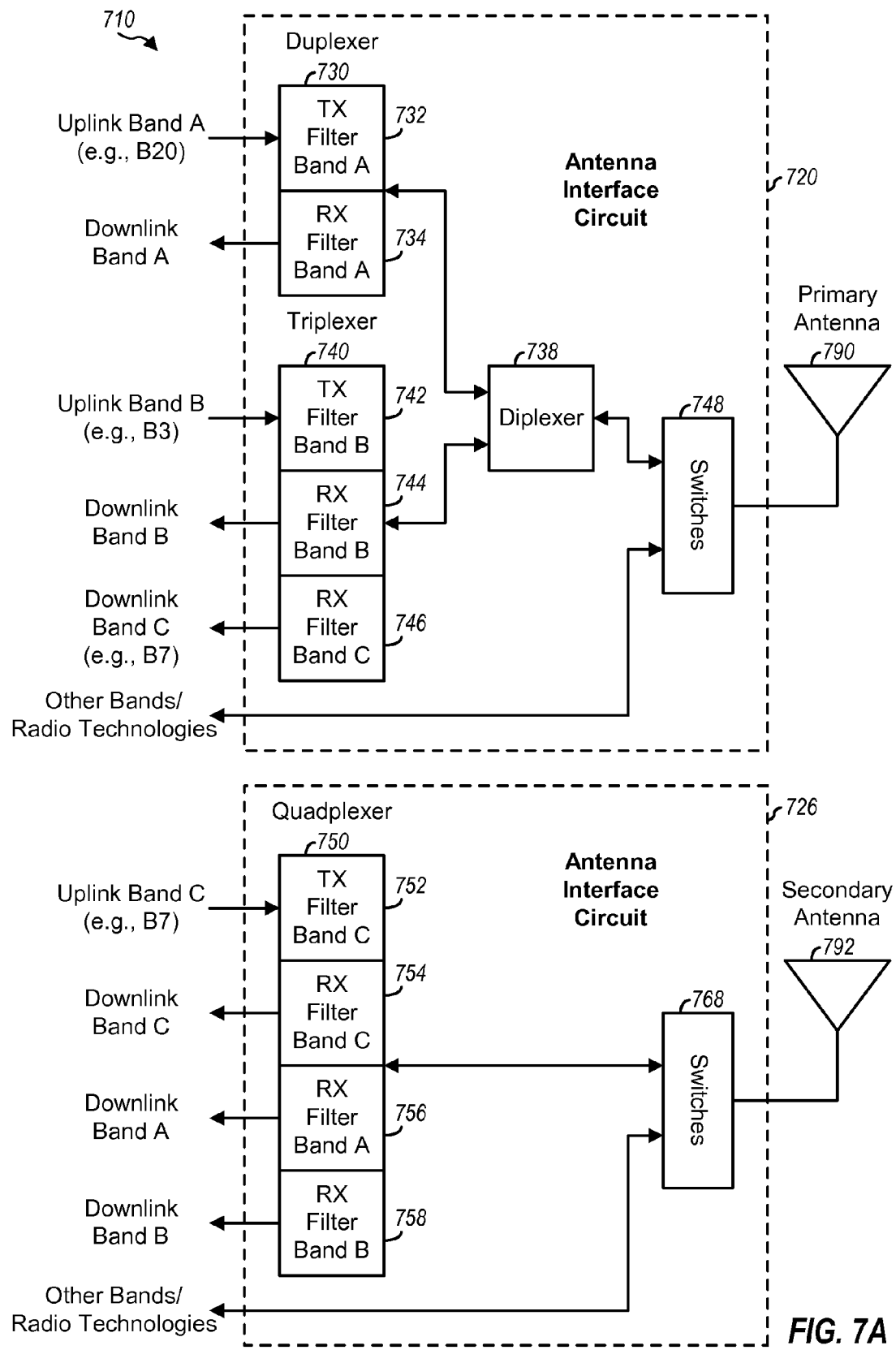
FIG. 7A shows an exemplary design of an RF front-end unit supporting carrier aggregation on three bands via two antennas with partial multiplexing.

FIG. 7A show an exemplary design of an RF front-end unit 710 comprising antenna interface circuits 720 and 726 supporting carrier aggregation on three bands A to C via two antennas with diversity reception for all three bands. Antenna interface circuits 720 and 726 may be used for antenna interface circuits 352 and 356, respectively, in FIG. 3. Antenna interface circuit 720 supports data transmission on the uplink on bands A and B and data reception on the downlink on all three bands via a primary antenna 790. Antenna interface circuit 726 supports data transmission on the uplink on band C and data reception on the downlink on all three bands via a secondary antenna 792.

In one exemplary design, bands A to C may cover frequency region 1 for LTE/UMTS and may be as follows:
Band A=Band 20 (B20),
Band B=Band 3 (B3), and
Band C=Band 7 (B7).

In the exemplary design described above, band A is in low-band, and bands B and C are in high-band. Bands A to C may also correspond to other combinations of bands.

In the exemplary design shown in FIG. 7A, antenna interface circuit 720 includes a duplexer 730 for band A and a triplexer 740 for bands B and C. Duplexer 730 includes a TX filter 732 for band A and an RX filter 734 for band A. The output of TX filter 732 and the input of RX filter 734 are coupled to an output of duplexer 730, which is coupled to a first filter (e.g., a lowpass filter) for band A in a diplexer 738. Triplexer 740 includes a TX filter 742 for band B, an RX filter 744 for band B, and an RX filter 746 for band C. The output of TX filter 742 and the inputs of RX filters 744 and 746 are coupled to an output of triplexer 740, which is coupled to a second filter (e.g., a highpass filter) for bands B and C in diplexer 738. Diplexer 738 is coupled to one input of switches 748. Switches 748 may include other inputs coupled to circuits for other radio technologies, other bands, etc. An output of switches 748 is coupled to primary antenna 790.

In the exemplary design shown in FIG. 7A, antenna interface circuit 726 includes a quadplexer 750 for bands A to C. Quadplexer 750 includes a TX filter 752 for band C, an RX filter 754 for band C, an RX filter 756 for band A, and an RX filter 758 for band B. The output of TX filter 752 and the inputs of RX filters 754 to 758 are coupled to an output of quadplexer 750, which is coupled to one input of switches 768. Other inputs of switches 768 may be coupled to circuits for other radio technologies, other bands, etc. An output of switches 768 is coupled to secondary antenna 792.

Figure 7B:
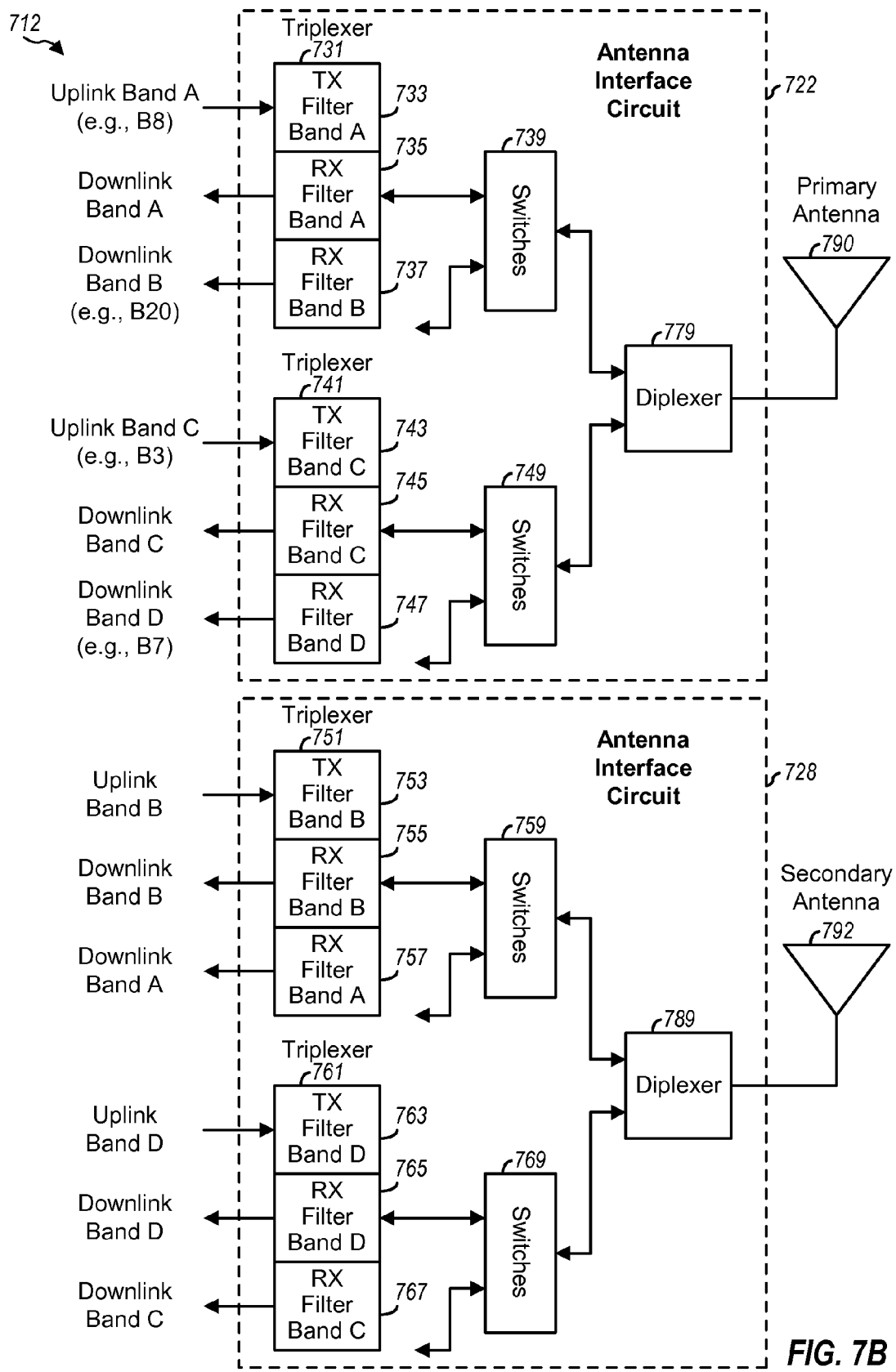
FIG. 7B shows an exemplary design of an RF front-end unit supporting carrier aggregation on four bands via two antennas with partial multiplexing.

FIG. 7B show an exemplary design of an RF front-end unit 712 comprising antenna interface circuits 722 and 728 supporting carrier aggregation on four bands A to D via two antennas with diversity reception for all four bands. Antenna interface circuits 722 and 728 may be used for antenna interface circuits 352 and 356, respectively, in FIG. 3. Antenna interface circuit 722 supports data transmission on the uplink on bands A and C and data reception on the downlink on all four bands via primary antenna 790. Antenna interface circuit 728 supports data transmission on the uplink on bands B and D and data reception on the downlink on all four bands via secondary antenna 792.

In one exemplary design, bands A to D may cover frequency region 1 for LTE/UMTS and may be as follows:
Band A=Band 8 (B8),
Band B=Band 20 (B20),
Band C=Band 3 (B3), and
Band D=Band 7 (B7).

In the exemplary design described above, bands A and B are in low-band, and bands C and D are in high-band. Bands A to D may also correspond to other combinations of bands.

In the exemplary design shown in FIG. 7B, antenna interface circuit 722 includes a triplexer 731 for bands A and B and a triplexer 741 for bands C and D. Triplexer 731 includes a TX filter 733 for band A, an RX filter 735 for band A, and an RX filter 737 for band B. The output of TX filter 733 and the inputs of RX filters 735 and 737 are coupled to an output of triplexer 731, which is coupled to an input of switches 739. Triplexer 741 includes a TX filter 743 for band C, an RX filter 745 for band C, and an RX filter 747 for band D. The output of TX filter 743 and the inputs of RX filters 745 and 747 are coupled to an output of triplexer 741, which is coupled to an input of switches 749. The output of switches 739 is coupled to a first filter (e.g., a lowpass filter) for bands A and B in a diplexer 779. The output of switches 749 is coupled to a second filter (e.g., a highpass filter) for bands C and D in diplexer 779. Diplexer 779 is coupled to primary antenna 790. Switches 739 and 749 may also couple to circuits for other radio technologies, other bands, etc.

In the exemplary design shown in FIG. 7B, antenna interface circuit 728 includes a triplexer 751 for bands A and B and a triplexer 761 for bands C and D. Triplexer 751 includes a TX filter 753 for band B, an RX filter 755 for band B, and an RX filter 757 for band A. The output of TX filter 753 and the inputs of RX filters 755 and 757 are coupled to an output of triplexer 751, which is coupled to an input of switches 759. Triplexer 761 includes a TX filter 763 for band D, an RX filter 765 for band D, and an RX filter 767 for band C. The output of TX filter 763 and the inputs of RX filters 765 and 767 are coupled to an output of triplexer 761, which is coupled to an input of switches 769. The output of switches 759 is coupled to a first filter for bands A and B in a diplexer 789. The output of switches 769 is coupled to a second filter for bands C and D in diplexer 789. Diplexer 789 is coupled to secondary antenna 792. Switches 759 and 769 may also couple to circuits for other radio technologies, other bands, etc.

Figure 8A:
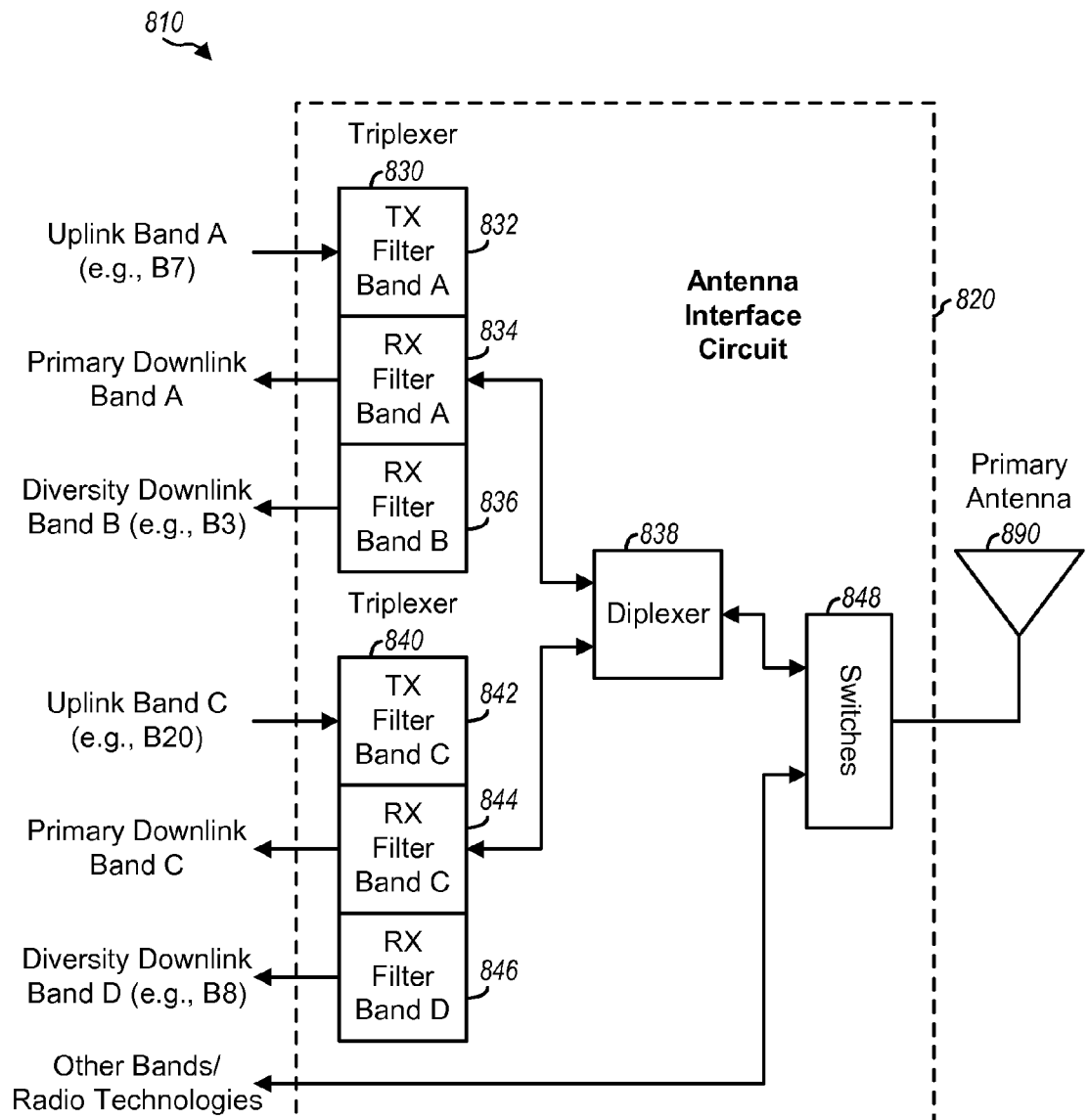
FIGS. 8A and 8B show an exemplary design of an RF front-end unit supporting carrier aggregation on four bands via two antennas with partial multiplexing.
Figure 8B:
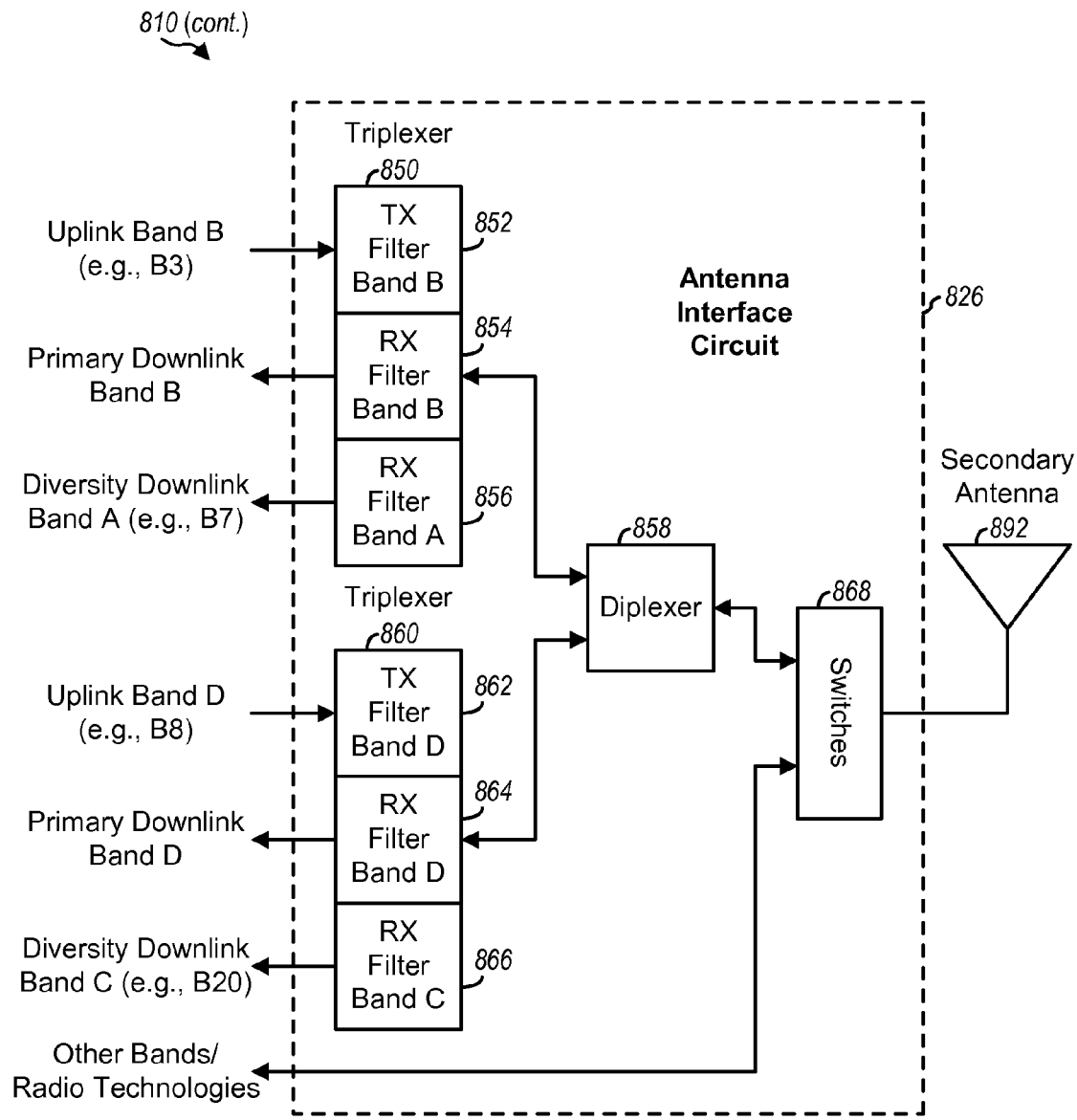

FIGS. 8A and 8B show an exemplary design of an RF front-end unit 810 comprising antenna interface circuits 820 and 826 supporting carrier aggregation on four bands A to D via two antennas with diversity reception for all four bands. Antenna interface circuit 820 in FIG. 8A may be used for antenna interface circuit 350 in FIG. 3, and antenna interface circuit 826 in FIG. 8B may be used for antenna interface circuit 356 in FIG. 3. Antenna interface circuit 820 supports data transmission on the uplink on bands A and C and data reception on the downlink on all four bands via a primary antenna 890. Antenna interface circuit 826 supports data transmission on the uplink on bands B and D and data reception on the downlink on all four bands via a secondary antenna 892.

In one exemplary design, bands A to D may cover frequency region 1 for LTE/UMTS and may be as follows:
Band A=Band 7 (B7),
Band B=Band 3 (B3),
Band C=Band 20 (B20), and
Band D=Band 8 (B8).

In the exemplary design described above, bands A and B are in high-band, and bands C and D are in low-band.

In another exemplary design, bands A to D may correspond to the following bands:
Band A=Band 5 (B5),
Band B=Band 17 (B17),
Band C=Band 4 (B4), and
Band D=Band 2 (B2).

Bands A to D may also correspond to other combinations of bands.

In the exemplary design shown in FIG. 8A, antenna interface circuit 820 includes a triplexer 830 for bands A and B, a triplexer 840 for bands C and D, a diplexer 838, and switches 848. Triplexer 830 includes a TX filter 832 for band A, an RX filter 834 for band A, and an RX filter 836 for band B. The output of TX filter 832 and the inputs of RX filters 834 and 836 are coupled to an output of triplexer 830, which is coupled to a first filter (e.g., a highpass filter) for bands A and B in diplexer 838. Triplexer 840 includes a TX filter 842 for band C, an RX filter 844 for band C, and an RX filter 846 for band D. The output of TX filter 842 and the inputs of RX filters 844 and 846 are coupled to an output of triplexer 840, which is coupled to a second filter (e.g., a lowpass filter) for bands C and D in diplexer 838. Diplexer 838 is coupled to one input of switches 848. Switches 848 may include other inputs coupled to circuits for other radio technologies, other bands, etc. An output of switches 848 is coupled to primary antenna 890.

In the exemplary design shown in FIG. 8B, antenna interface circuit 826 includes a triplexer 850 for bands A and B, a triplexer 860 for bands C and D, a diplexer 858, and switches 868. Triplexer 850 includes a TX filter 852 for band B, an RX filter 854 for band B, and an RX filter 856 for band A. The output of TX filter 852 and the inputs of RX filters 854 and 856 are coupled to an output of triplexer 850, which is coupled to diplexer 858. Triplexer 860 includes a TX filter 862 for band D, an RX filter 864 for band D, and an RX filter 866 for band C. The output of TX filter 862 and the inputs of RX filters 864 and 866 are coupled to an output of triplexer 860, which is coupled to diplexer 858. Diplexer 858 is coupled to one input of switches 868. Other inputs of switches 868 may be coupled to circuits for other radio technologies, other bands, etc. An output of switches 868 is coupled to secondary antenna 892.

The exemplary design in FIGS. 8A and 8B may provide various advantages. First, it may be easier to implement triplexers 830, 840, 850 and 860 than quadplexers with lower insertion loss. Second, power levels of harmonics and IMD products of different combinations of bands A and B (e.g., Bands 7 and 3), bands A and D (e.g., Bands 7 and 8), bands B and C (e.g., Bands 3 and 20), and bands C and D (e.g., Bands 20 and 8) may be significantly lower with partial multiplexing. Third, triplexers 830, 840, 850 and 860 do not impact the performance of other radio technologies since filters for the second other radio technologies may be coupled directly to switches 848 and 868 and hence would not observe additional insertion loss.

Figure 9A:
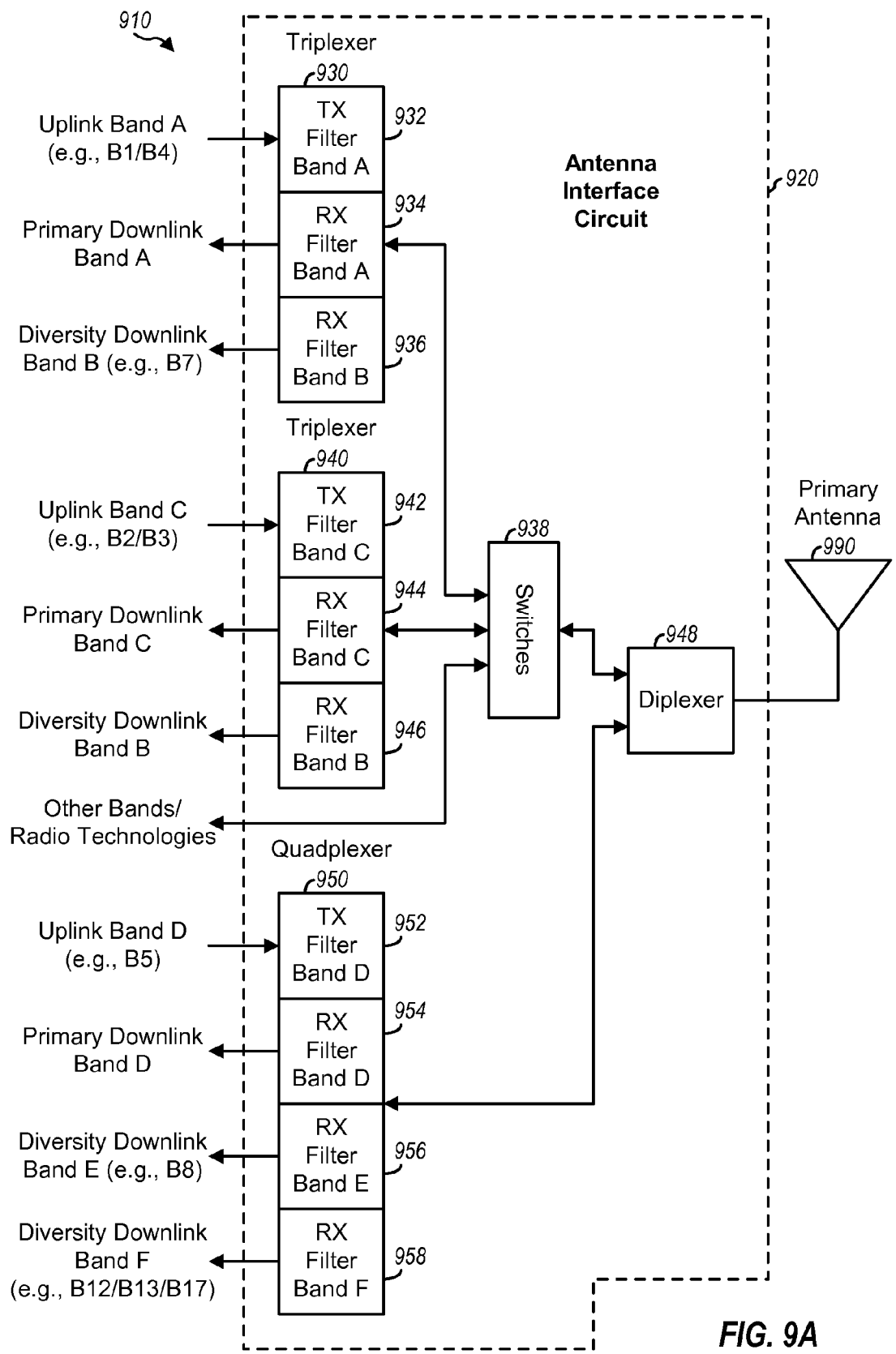
FIGS. 9A and 9B show an exemplary design of an RF front-end unit supporting carrier aggregation on six bands via two antennas with partial multiplexing.
Figure 9B:
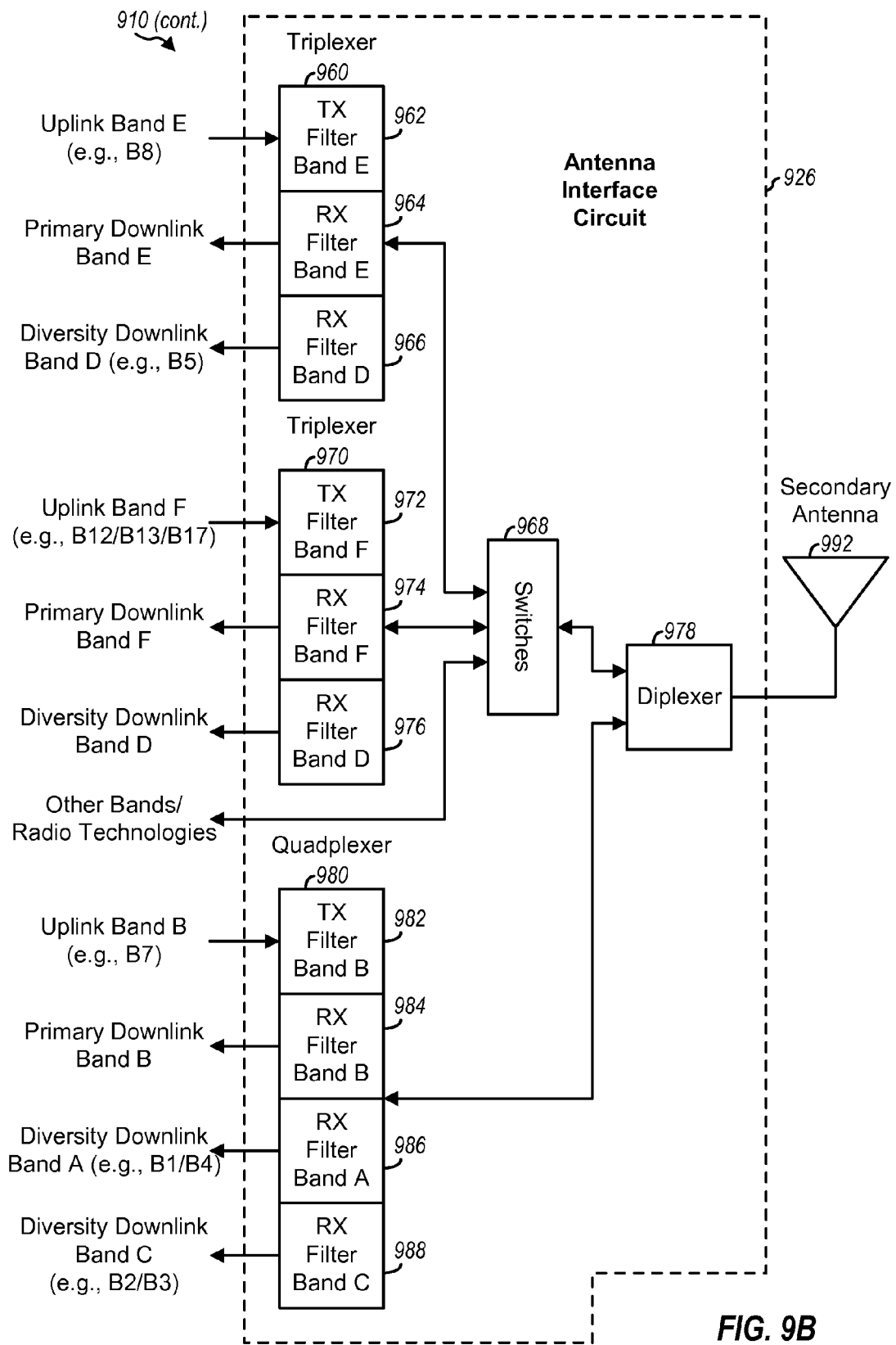

FIGS. 9A and 9B show an exemplary design of an RF front-end unit 910 comprising antenna interface circuits 920 and 926 supporting carrier aggregation on six bands A to F via two antennas with diversity reception for all six bands. Antenna interface circuit 920 in FIG. 9A may be used for antenna interface circuit 350 in FIG. 3, and antenna interface circuit 926 in FIG. 9B may be used for antenna interface circuit 356 in FIG. 3. Antenna interface circuit 920 supports data transmission on the uplink on bands A, C and D and data reception on the downlink on all six bands via a primary antenna 990. Antenna interface circuit 926 supports data transmission on the uplink on bands B, E and F and data reception on the downlink on all six bands via a secondary antenna 992.

In one exemplary design, bands A to F may cover frequency regions 2 and 3 for LTE/UMTS and may be as follows:
Band A=Band 1 and/or Band 4 (B1/B4),
Band B=Band 7 (B7),
Band C=Band 2 and/or Band 3 (B2/B3),
Band D=Band 5 (B5),
Band E=Band 8 (B8), and
Band F=Band 12, Band 13, and/or Band 17 (B12/B13/B17).

In the exemplary design given above, bands A, B and C are in high-band, and bands D, E and F are in low-band. Bands A to F may also correspond to other combinations of bands.

In the exemplary design shown in FIG. 9A, antenna interface circuit 920 includes a triplexer 930 for bands A and B, a triplexer 940 for bands B and C, a quadplexer 950 for bands D, E and F, switches 938, and a diplexer 948. Triplexer 930 includes a TX filter 932 for band A, an RX filter 934 for band A, and an RX filter 936 for band B. The output of TX filter 932 and the inputs of RX filters 934 and 936 are coupled to an output of triplexer 930, which is coupled to a first input of switches 938. Triplexer 940 includes a TX filter 942 for band C, an RX filter 944 for band C, and an RX filter 946 for band B. The output of TX filter 942 and the inputs of RX filters 944 and 946 are coupled to an output of triplexer 940, which is coupled to a second input of switches 938. Switches 938 may include other inputs coupled to circuits for other radio technologies, other bands, etc. Switches 938 also include an output coupled to a first filter (e.g., a highpass filter) for bands A, B and C in diplexer 948. Quadplexer 950 includes a TX filter 952 for band D, an RX filter 954 for band D, an RX filter 956 for band E, and an RX filter 958 for band F. The output of TX filter 952 and the inputs of RX filters 954, 956 and 958 are coupled to an output of quadplexer 950, which is coupled to a second filter (e.g., a lowpass filter) for bands D, E and F in diplexer 948. Diplexer 948 is coupled to primary antenna 990.

In the exemplary design shown in FIG. 9B, antenna interface circuit 926 includes a triplexer 960 for bands D and E, a triplexer 970 for bands D and F, a quadplexer 980 for bands A, B and C, switches 968, and a diplexer 978. Triplexer 960 includes a TX filter 962 for band E, an RX filter 964 for band E, and an RX filter 966 for band D. The output of TX filter 962 and the inputs of RX filters 964 and 966 are coupled to an output of triplexer 960, which is coupled to a first input of switches 968. Triplexer 970 includes a TX filter 972 for band F, an RX filter 974 for band F, and an RX filter 976 for band D. The output of TX filter 972 and the inputs of RX filters 974 and 976 are coupled to an output of triplexer 970, which is coupled to a second input of switches 968. Switches 968 may include other inputs coupled to circuits for other radio technologies, other bands, etc. Switches 968 also include an output coupled to a first filter (e.g., a lowpass filter) for bands D, E and F in diplexer 978. Quadplexer 980 includes a TX filter 982 for band B, an RX filter 984 for band B, an RX filter 986 for band A, and an RX filter 988 for band C. The output of TX filter 982 and the inputs of RX filters 984, 986 and 988 are coupled to an output of quadplexer 980, which is coupled to a second filter (e.g., a highpass filter) for bands A, B and C in diplexer 978. Diplexer 978 is coupled to secondary antenna 992.

Figure 10:
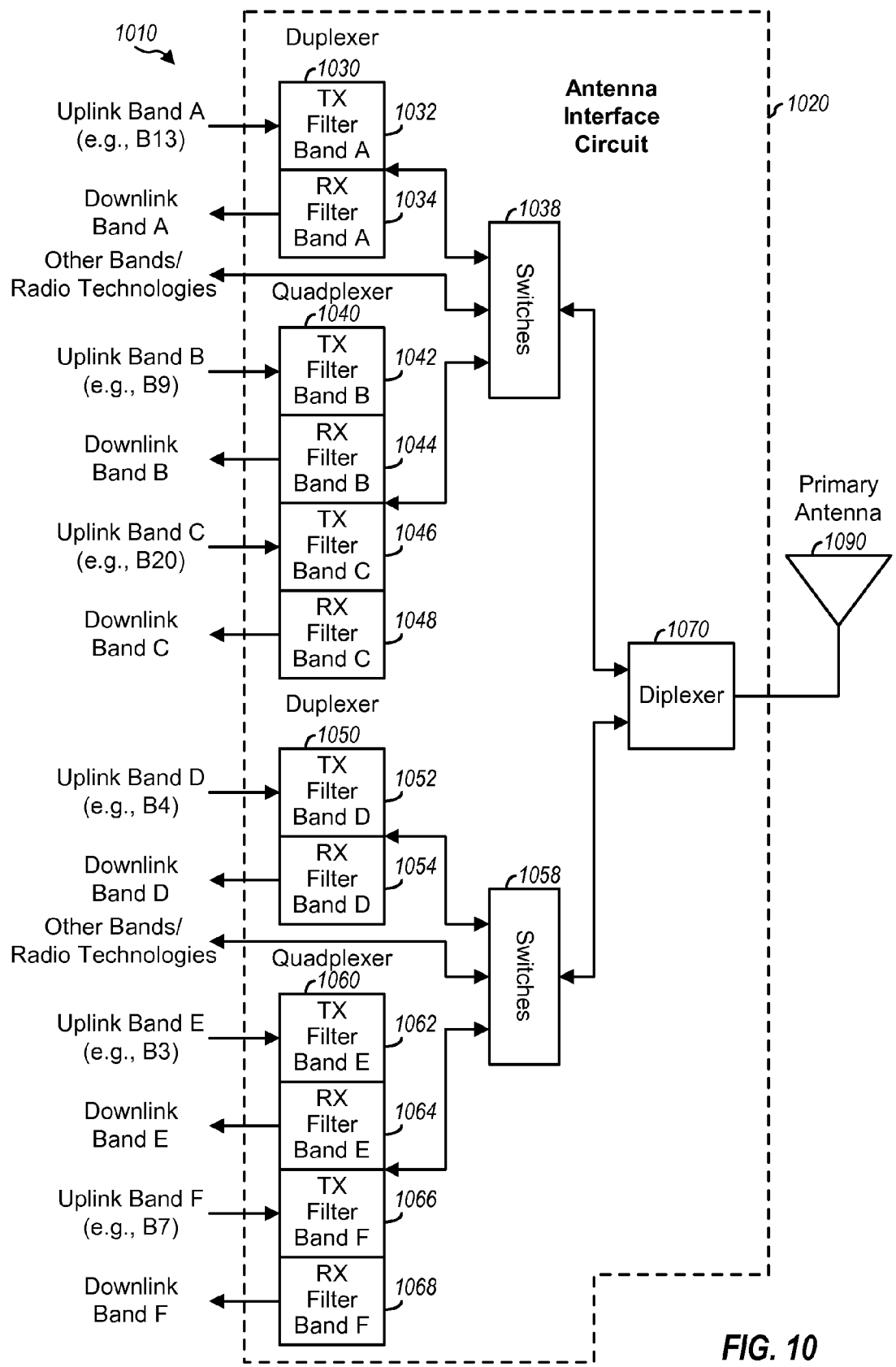
FIG. 10 shows an exemplary design of an RF front-end unit supporting communicating on six bands.

FIG. 10 shows an exemplary design of an RF front-end unit 1010 comprising an antenna interface circuit 1020 supporting carrier aggregation on six bands A to F. Antenna interface circuit 1020 supports data transmission on the uplink and data reception on the downlink on all six bands via primary antenna 1090. Another antenna interface circuit may be used for a secondary antenna and may be implemented in similar manner as antenna interface circuit 1020.

In one exemplary design, bands A to F may correspond to the following bands:
Band A=Band 13 (B13),
Band B=Band 9 (B9),
Band C=Band 20 (B20),
Band D=Band 4 (B4),
Band E=Band 3 (B3), and
Band F=Band 7 (B7).

Bands A to F may also correspond to other combinations of bands.

In the exemplary design shown in FIG. 10, antenna interface circuit 1020 includes a duplexer 1030 for band A, a quadplexer 1040 for bands B and C, a duplexer 1050 for band D, a quadplexer 1060 for bands E and F, switches 1038 and 1058, and a diplexer 1070. Duplexer 1030 includes a TX filter 1032 for band A and an RX filter 1034 for band A. The output of TX filter 1032 and the input of RX filter 1034 are coupled to an output of duplexer 1030, which is coupled to a first input of switches 1038. Quadplexer 1040 includes a TX filter 1042 for band B, an RX filter 1044 for band B, a TX filter 1046 for band C, and an RX filter 1048 for band C. The outputs of TX filters 1042 and 1046 and the inputs of RX filters 1044 and 1048 are coupled to an output of quadplexer 1040, which is coupled to a second input of switches 1038. Switches 1038 may include other inputs coupled to circuits for other radio technologies, other bands, etc. Switches 1038 also includes an output coupled to a first filter (e.g., a lowpass filter) for bands A, B and C in diplexer 1070.

Duplexer 1050 includes a TX filter 1052 for band D and an RX filter 1054 for band D. The output of TX filter 1052 and the input of RX filter 1054 are coupled to an output of duplexer 1050, which is coupled to a first input of switches 1058. Quadplexer 1060 includes a TX filter 1062 for band E, an RX filter 1064 for band E, a TX filter 1066 for band F, and an RX filter 1068 for band F. The outputs of TX filters 1062 and 1066 and the inputs of RX filters 1064 and 1068 are coupled to an output of quadplexer 1060, which is coupled to a second input of switches 1058. Switches 1058 may include other inputs coupled to circuits for other radio technologies, other bands, etc. Switches 1058 also includes an output coupled to a second filter (e.g., a highpass filter) for bands D, E and F in diplexer 1070.

In an exemplary design, an apparatus (e.g., a wireless device, an IC, a circuit module, etc.) may comprise first and second antenna interface circuits. The first antenna interface circuit (e.g., antenna interface circuit 550 in FIG. 5A) may comprise a first TX filter (e.g., TX filter 562) for a first band. The first TX filter may filter a first RF signal prior to transmission via a first antenna (e.g., primary antenna 590). The second antenna interface circuit (e.g., antenna interface circuit 556 in FIG. 5A) may comprise a second TX filter (e.g., TX filter 572) for a second band. The second band may be the same as the first band or may be different from the first band. The second TX filter may filter a second RF signal prior to transmission via a second antenna (e.g., secondary antenna 592). The first and second RF signals may be transmitted simultaneously on the first and second bands to a wireless network. For example, the first and second RF signals may be transmitted simultaneously on first and second carriers, respectively, in the first and second bands for carrier aggregation. The first RF signal may be transmitted on the first band via the first antenna interface circuit and the first antenna. The second RF signal may be transmitted on the second band via the second antenna interface circuit and the second antenna.

The second band may be different from the first band. In an exemplary design, the first and second bands may be in the same band group, which may be low-band, or mid-band, or high-band. In another exemplary design, the first and second bands may be in different band groups, e.g., low-band and mid-band, or low-band and high-band, or mid-band and high-band.

In an exemplary design shown in FIG. 5A, the first antenna interface circuit may comprise a first triplexer (e.g., triplexer 560) including the first TX filter for the first band, a first RX filter (e.g., RX filter 564) for the first band, and a second RX filter (e.g., RX filter 566) for the second band. The second antenna interface circuit may comprise a second triplexer (e.g., triplexer 570) including the second TX filter for the second band, a third RX filter (e.g., RX filter 574) for the second band, and a fourth RX filter (e.g., RX filter 576) for the first band.

In one exemplary design, which is shown in FIG. 5A, each antenna may support primary RX for one band and diversity RX for another band. The first RX filter may be configured as primary downlink for the first band, and the second RX filter may be configured as diversity downlink for the second band. The third RX filter may be configured as primary downlink for the second band, and the fourth RX filter may be configured as diversity downlink for the first band.

In another exemplary design, which shown in FIG. 5B, the primary antenna may support primary downlink for both bands, and the secondary antenna may support diversity downlink for both bands. The first RX filter may be configured as primary downlink for the first band, and the second RX filter may be configured as primary downlink for the second band. The third RX filter may be configured as diversity downlink for the second band, and the fourth RX filter may be configured as diversity downlink for the first band.

In another exemplary design shown in FIG. 5F, the first antenna interface circuit may comprise a duplexer (e.g., duplexer 561) including the first TX filter and an RX filter for the first band. Alternatively or additionally, the second antenna interface circuit may comprise a duplexer (e.g., duplexer 571 in FIGS. 5D and 5F) including the second TX filter and an RX filter for the second band.

In one exemplary design, a lowpass filter (e.g., lowpass filter 568 in FIG. 5C) may be coupled to the first TX filter. The lowpass filter may filter the first RF signal and attenuate at least one harmonic (e.g., a third harmonic) of the first RF signal. The first RF signal may be sent in the first band, but a harmonic of the first RF signal may fall within a receive frequency range of the second band. The lowpass filter may attenuate this harmonic of the first RF signal, which may improve performance of data reception.

In another exemplary design shown in FIG. 8A, the first antenna interface circuit may comprise first and second triplexers. The first triplexer (e.g., triplexer 830 in FIG. 8A) may include the first TX filter for the first band, a first RX filter (e.g., RX filter 834) for the first band, and a second RX filter (e.g., RX filter 836) for the second band. The second triplexer (e.g., triplexer 840) may include a third TX filter (e.g., TX filter 842) for a third band, a third RX filter (e.g., RX filter 844) for the third band, and a fourth RX filter (e.g., RX filter 846) for a fourth band. The first antenna interface circuit may further comprise a diplexer and at least one switch. The diplexer (e.g., diplexer 838) may be coupled between the first and second triplexers and the first antenna. The at least one switch (e.g., switches 848) may be coupled between the diplexer and the first antenna.

In the exemplary design shown in FIG. 8B, the second antenna interface circuit may comprise third and fourth triplexers. The third triplexer (e.g., triplexer 850 in FIG. 8B) may include the second TX filter (e.g., TX filter 852) for the second band, a fifth RX filter (e.g., RX filter 854) for the second band, and a sixth RX filter (e.g., RX filter 856) for the first band. The fourth triplexer (e.g., triplexer 860) may include a fourth TX filter (e.g., TX filter 860) for the fourth band, a seventh RX filter (e.g., RX filter 864) for the fourth band, and an eighth RX filter (e.g., RX filter 866) for the third band. The second antenna interface circuit may further comprise a diplexer (e.g., diplexer 858) and at least one switch (e.g., switches 868) coupled between the third and fourth triplexers and the second antenna.

In yet another exemplary design shown in FIG. 9A, the first antenna interface circuit may comprise first, second and third multiplexers. The first multiplexer (e.g., triplexer 930 in FIG. 9A) may include the first TX filter and a first RX filter (e.g., RX filter 934) for the first band. The second multiplexer (e.g., triplexer 940) may include a third TX filter (e.g., TX filter 942) and a second RX filter (e.g., RX filter 944) for a third band. The third multiplexer (e.g., quadplexer 950) may include a fourth TX filter (e.g., TX filter 952) and a third RX filter (e.g., RX filter 954) for a fourth band. The first antenna interface circuit may further comprise (i) at least one switch (e.g., switches 938) coupled to the first and second multiplexers and (ii) a diplexer (e.g., diplexer 948) coupled to the at least one switch, the third multiplexer, and the first antenna. The first, second, and third multiplexers may comprise additional TX filters and/or RX filters, e.g., as shown in FIG. 9A.

In the exemplary design shown in FIG. 9B, the second antenna interface circuit may comprise fourth, fifth, and sixth multiplexers. The fourth multiplexer (e.g., triplexer 960 in FIG. 9B) may include the second TX filter (e.g., TX filter 962) and a fourth RX filter (e.g., RX filter 964) for the second band. The fifth multiplexer (e.g., triplexer 970) may include a fifth TX filter (e.g., TX filter 972) and a fifth RX filter (e.g., RX filter 974) for a fifth band. The sixth multiplexer (e.g., quadplexer 980) may include a sixth TX filter (e.g., TX filter 982) and a sixth RX filter (e.g., RX filter 984) for a sixth band. The fourth, fifth, and sixth multiplexers may comprise additional TX filters and/or RX filters, e.g., as shown in FIG. 9B.

In an exemplary design, the first antenna may be isolated from the second antenna by at least a target antenna-to-antenna isolation, which may be 15 dB or some other value. The antenna-to-antenna isolation may provide various advantages described above (e.g., reduced power levels of harmonics and IMD products) when the first and second RF signals are transmitted simultaneously on different bands via different antennas for carrier aggregation.

In another exemplary design, an apparatus (e.g., a wireless device, an IC, a circuit module, etc.) may comprise a triplexer and a multiplexer. The triplexer may be operatively coupled to a first antenna and may comprise a first TX filter for a first band, a first RX filter for the first band, and a second RX filter for a second band. The second band is different from the first band. The multiplexer may be operatively coupled to a second antenna and may comprise a second TX filter for the second band and a third RX filter for the first band. The triplexer and the multiplexer may support communication (e.g., with a single wireless network) on one or both of the first and second bands.

In an exemplary design, the multiplexer may be a triplexer and may include the second TX filter for the second band, the third RX filter for the first band, and a fourth RX filter for the second band. In another exemplary design, the multiplexer may be a duplexer, or a quadplexer, or some other circuit.

In an exemplary design, the triplexer and the multiplexer may support carrier aggregation on the downlink and may receive downlink data transmissions sent simultaneously on the first and second bands. In another exemplary design, the triplexer and the multiplexer may support carrier aggregation on the uplink and may simultaneously send (i) a first uplink data transmission on the first band via the first antenna and (ii) a second uplink data transmission on the second band via the second antenna for carrier aggregation. In yet another exemplary design, the triplexer may send an uplink data transmission on the first band via the first antenna without carrier aggregation.

Figure 11:
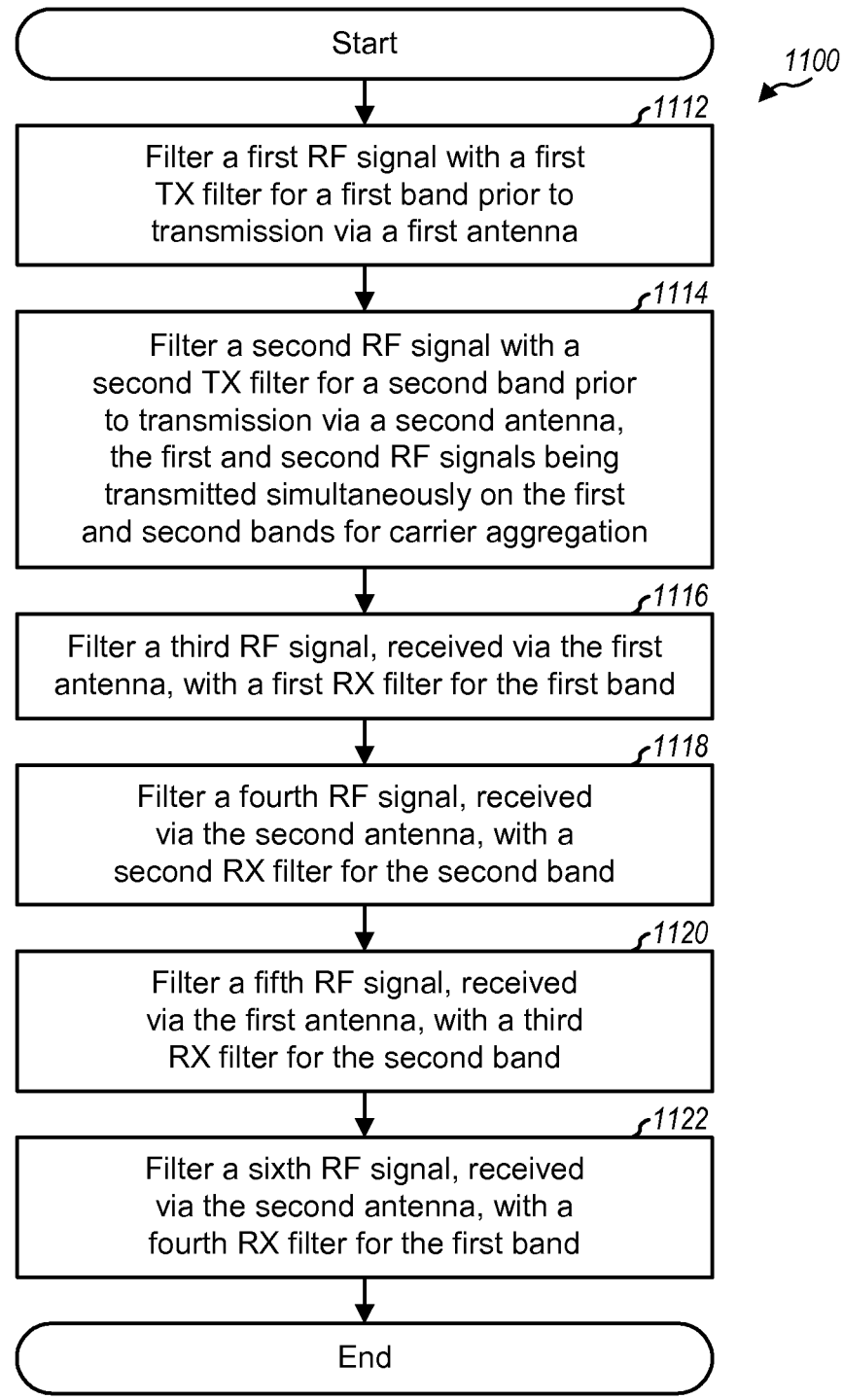
FIG. 11 shows a process for supporting carrier aggregation with partial multiplexing.

FIG. 11 shows an exemplary design of a process 1100 for supporting carrier aggregation. A first RF signal may be filtered with a first TX filter (e.g., TX filter 562 in FIG. 5A) for a first band prior to transmission via a first antenna (block 1112). A second RF signal may be filtered with a second TX filter (e.g., TX filter 572) for a second band prior to transmission via a second antenna (block 1114). The first and second RF signals may be transmitted simultaneously on the first and second bands via the first and second antennas for carrier aggregation.

A third RF signal may be received via the first antenna and may be filtered with a first RX filter (e.g., RX filter 564 in FIG. 5A) for the first band (block 1116). A fourth RF signal may be received via the second antenna and may be filtered with a second RX filter (e.g., RX filter 574) for the second band (block 1118). A fifth RF signal may be received via the first antenna and may be filtered with a third RX filter (e.g., RX filter 566) for the second band (block 1120). A sixth RF signal may be received via the second antenna and may be filtered with a fourth RX filter (e.g., RX filter 576) for the first band (block 1122).

The antenna interface circuits and filters described herein may be implemented on an IC, an analog IC, an RFIC, a mixed-signal IC, an ASIC, a printed circuit board (PCB), an electronic device, etc. The antenna interface circuits and filters may also be fabricated with various technologies. Active circuits in the antenna interface circuits may be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing the antenna interface circuits and/or filters described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus comprising:
   a first antenna interface circuit comprising a first transmit (TX) filter for a first band, the first TX filter configured to filter a first radio frequency (RF) signal prior to transmission via a first antenna; and
   a second antenna interface circuit comprising a second TX filter for a second band, the second TX filter configured to filter a second RF signal prior to transmission via a second antenna, the first and second TX filters configured to filter the first and second RF signals sent simultaneously on the first and second bands to a wireless network, and at least one of the first and second antenna interface circuits including a receive (RX) filter for the first band, and another RX filter for the second band, the RX filter and the another RX filter receiving on a common antenna, the first and second bands configured for carrier aggregation.

2. The apparatus of claim 1, the first and second RF signals being sent simultaneously on first and second carriers, respectively, for carrier aggregation.

3. The apparatus of claim 1, the first antenna interface circuit comprising a first triplexer including the first TX filter for the first band, a first receive (RX) filter for the first band, and a second RX filter for the second band.

4. The apparatus of claim 3, the second antenna interface circuit comprising a second triplexer including the second TX filter for the second band, a third RX filter for the second band, and a fourth RX filter for the first band.

5. The apparatus of claim 3, the first antenna interface circuit further comprising a duplexer including a third TX filter for the third band and a third RX filter for the third band.

6. The apparatus of claim 1, the first antenna interface circuit comprising a duplexer including the first TX filter and a receive (RX) filter for the first band.

7. The apparatus of claim 1, the second antenna interface circuit comprising a duplexer including the second TX filter and a receive (RX) filter for the second band.

8. The apparatus of claim 1, the first antenna interface circuit comprising a quadplexer including the first TX filter for the first band, a first receive (RX) filter for the first band, a third TX filter for a third band, and a second RX filter for the third band.

9. The apparatus of claim 1, the first antenna interface circuit comprising a lowpass filter coupled to the first TX filter and configured to filter the first RF signal and attenuate at least one harmonic of the first RF signal.

10. The apparatus of claim 1, the first antenna interface circuit comprising:
    a first triplexer including the first TX filter for the first band, a first receive (RX) filter for the first band, and a second RX filter for the second band; and
    a second triplexer including a third TX filter for a third band, a third RX filter for the third band, and a fourth RX filter for a fourth band.

11. The apparatus of claim 10, the second antenna interface circuit comprising:

a third triplexer including the second TX filter for the second band, a fifth RX filter for the second band, and a sixth RX filter for the first band; and a fourth triplexer including a fourth TX filter for the fourth band, a seventh RX filter for the fourth band, and an eighth RX filter for the third band.

12. The apparatus of claim 10, the first antenna interface circuit further comprising a diplexer coupled between the first and second triplexers and the first antenna.

13. The apparatus of claim 12, the first antenna interface circuit further comprising at least one switch coupled between the diplexer and the first antenna.

14. The apparatus of claim 1, further comprising:
at least one switch coupled between the first TX filter and the first antenna, the first TX filter being used for a first radio technology; and
at least one filter for a second radio technology coupled to the at least one switch.

15. The apparatus of claim 1, the first antenna interface circuit comprising:
a first multiplexer including the first TX filter and a first receive (RX) filter for the first band;
a second multiplexer including a third TX filter and a second RX filter for a third band; and
a third multiplexer including a fourth TX filter and a third RX filter for a fourth band.

16. The apparatus of claim 15, the first antenna interface circuit further comprising:
at least one switch coupled to the first and second multiplexers; and
a diplexer coupled to the at least one switch, the third multiplexer, and the first antenna.

17. An apparatus comprising:
a triplexer operatively coupled to a first antenna and comprising a first transmit (TX) filter for a first band, a first receive (RX) filter for the first band, and a second RX filter for a second band, the first RX filter and the second RX filter receiving on the first antenna, the first and second bands configured for carrier aggregation; and
a multiplexer operatively coupled to a second antenna and comprising a second TX filter for the second band and a third RX filter for the first band.

18. The apparatus of claim 17, the multiplexer comprising a second triplexer and including the second TX filter for the second band, the third RX filter for the first band, and a fourth RX filter for the second band.

19. The apparatus of claim 17, the triplexer and the multiplexer configured to receive downlink data transmissions sent simultaneously on the first and second bands for carrier aggregation.

20. The apparatus of claim 17, the triplexer and the multiplexer configured to simultaneously send a first uplink data transmission on the first band via the first antenna and a second uplink data transmission on the second band via the second antenna for carrier aggregation.

21. The apparatus of claim 17, the triplexer configured to send an uplink data transmission on the first band via the first antenna without carrier aggregation.

22. A method comprising:
filtering in a first antenna interface circuit a first radio frequency (RF) signal with a first transmit (TX) filter for a first band prior to transmission via a first antenna; and
filtering in a second antenna interface circuit a second RF signal with a second TX filter for a second band prior to transmission via a second antenna, the first and second RF signals being transmitted simultaneously on the first and second bands for carrier aggregation, and at least one of the first and second antenna interface circuits including a receive (RX) filter for the first band, and another RX filter for the second band, the RX filter and the another RX filter receiving on a common antenna, the first and second bands configured for carrier aggregation.

23. The method of claim 22, further comprising:
filtering a third RF signal, received via the first antenna, with a first receive (RX) filter for the first band; and
filtering a fourth RF signal, received via the second antenna, with a second RX filter for the second band.

24. The method of claim 23, further comprising:
filtering a fifth RF signal, received via the first antenna, with a third RX filter for the second band; and
filtering a sixth RF signal, received via the second antenna, with a fourth RX filter for the first band.

25. An apparatus comprising:
means for filtering in a first antenna interface circuit a first radio frequency (RF) signal for a first band prior to transmission via a first antenna; and
means for filtering in a second antenna interface circuit a second RF signal for a second band prior to transmission via a second antenna, the first and second RF signals being transmitted simultaneously on the first and second bands for carrier aggregation, and at least one of the first and second antenna interface circuits including a receive (RX) filter for the first band, and another RX filter for the second band, the RX filter and the another RX filter receiving on a common antenna, the first and second bands configured for carrier aggregation.

26. The apparatus of claim 25, further comprising:
means for filtering a third RF signal, received via the first antenna, for the first band; and
means for filtering a fourth RF signal, received via the second antenna, for the second band.

27. The apparatus of claim 26, further comprising:
means for filtering a fifth RF signal, received via the first antenna, for the second band; and
means for filtering a sixth RF signal, received via the second antenna, for the first band.

* * * * *